United States Patent
Rotenberg et al.

(10) Patent No.: US 10,747,921 B2
(45) Date of Patent: Aug. 18, 2020

(54) SOFTWARE TOOL FOR SIMULATING OPERATION OF HARDWARE AND SOFTWARE SYSTEMS

(71) Applicant: CYIENT, INC., East Hartford, CT (US)

(72) Inventors: Aaron Rotenberg, Indialantic, FL (US); Rocus Halbasch, Tampa, FL (US); Vanessa Uphoff, Palm Bay, FL (US)

(73) Assignee: CYIENT, INC., East Hartford, CT (US)

( * ) Notice: Subject to any disclaimer, the term of this patent is extended or adjusted under 35 U.S.C. 154(b) by 425 days.

(21) Appl. No.: 15/399,718

(22) Filed: Jan. 5, 2017

(65) Prior Publication Data
US 2017/0337308 A1 Nov. 23, 2017

Related U.S. Application Data

(60) Provisional application No. 62/274,977, filed on Jan. 5, 2016.

(51) Int. Cl.
*G06F 30/33* (2020.01)
*G06F 11/36* (2006.01)
*G06F 117/08* (2020.01)

(52) U.S. Cl.
CPC .......... *G06F 30/33* (2020.01); *G06F 11/3664* (2013.01); *G06F 2117/08* (2020.01)

(58) Field of Classification Search
CPC ............ G06F 17/5022; G06F 11/3664; G06F 2217/86; G06F 30/33; G06F 2217/08
(Continued)

(56) References Cited

U.S. PATENT DOCUMENTS 7,412,366 B1 * 8/2008 Englehart ................. G06F 8/34
 703/6
9,020,796 B2 4/2015 Amalfitano et al.
(Continued)

OTHER PUBLICATIONS

Matlab & Simulink , "Simulink 7 User's Guide", 2011. 1984 Pages.*
(Continued)

*Primary Examiner* — Eunhee Kim
(74) *Attorney, Agent, or Firm* — Taft Stettinius & Hollister LLP; Adam Wolek; Anthony P. Filomena

(57) ABSTRACT

A method for simulating operation of a system. The method accesses information characterizes system behavior, identifies system components and characterizes component behavior and relationships. The components include composite or non-composite unit types. A user selects an instance root and the method induces an instance hierarchy from that root. The instance hierarchy is displayed on a GUI in the form of a navigable tree or breadcrumbs view. Operation of the system is simulated using the instance hierarchy. Embodiments further include the concepts of merging certain variable names, displaying producing and consuming downstream and upstream elements, positioning, rotating, or orienting diagram elements to avoid overlapping with other diagram elements, identifying statically constant variables and propagating constness to producer and consumer variables, storing simulation results in compressed form and decompressing as needed, and identifying differences between dataflow diagrams.

14 Claims, 24 Drawing Sheets

(58) Field of Classification Search
USPC .......................................................... 703/22
See application file for complete search history.

(56) References Cited

U.S. PATENT DOCUMENTS

| | | | | |
|---|---|---|---|---|
| 2009/0037848 | A1* | 2/2009 | Tewari | G06Q 30/06 715/835 |
| 2011/0202887 | A1* | 8/2011 | Mendez | G06F 8/34 715/853 |
| 2012/0177135 | A1* | 7/2012 | Gahinet | G05B 13/047 375/260 |
| 2012/0192013 | A1 | 7/2012 | Amalfitano et al. | |
| 2012/0192158 | A1 | 7/2012 | Amalfitano et al. | |
| 2012/0266130 | A1* | 10/2012 | Kinnucan, Jr. | G06F 8/10 717/105 |

OTHER PUBLICATIONS

Damas, Luis, et al. "Principal Type-Schemes for Functional Programs". First published in POPL '82: Proceedings of the 9th ACM SIGPLAN-SIGACT symposium on Principles of Programming Languages, ACM, pp. 207-212.

Halbwachs, Nicholas, et al. "The Synchronous Data Flow Programming Language LUSTRE". Invited Paper, Proceedings of the IEEE, vol. 79, No. 9; Sep. 1991.

Hindley, R., "The Principal Type-Scheme of an Object in Combinatory Logic." Transactions of the American Mathematical Society, vol. 146; Dec. 1969, p. 29-60.

Lublinerman, Roberto, et al. "Modular Code Generation from Synchronous Block Diagrams—Modularity vs. Code Size." ACM Symposium on Principles of Programming Languages (POPL '09), 12 Pages.

Milner, Robin. "A Theory of Type Polymorphism in Programming." Computer Science Department, University of Edinburgh, Edinburgh, Scotland. Apr. 19, 1978, p. 348-375.

ISO. "ISO/IEC 19505:2012—Object Management Group Unified Modeling Language (TM)—(OMG UML)" 2012, 794 Pages.

Pouzet, Marc, et al. "Modular Static Scheduling of Synchronous Data-Flow Networks; An Efficient Symbolic Representation." Jan. 2010, 30 Pages.

Tripakis, Stavros, et al. "Translating Discrete-Time Simulink to Lustre." Verimag, Centre Equation, 2, avenue de Vignate, 38610 G, 40 Pages.

\* cited by examiner

▢ Floor 1 Call Button Light
▢ Floor 1 Destination Button Light
▢ Direction
▢ Open Door
▢ Queued

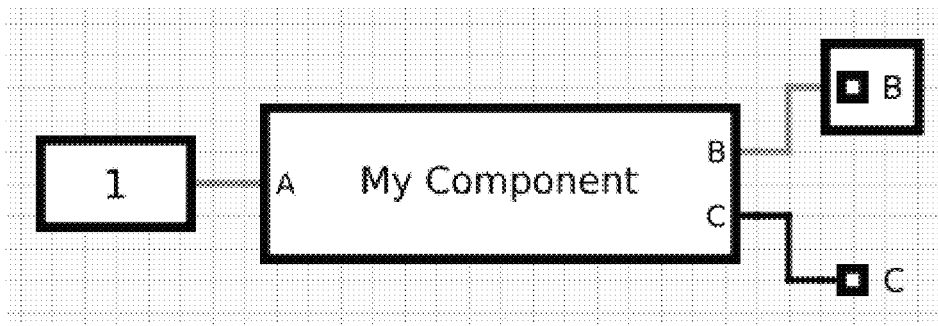
FIGURE 29
| My Component : My Component | |
|---|---|
| Inputs | Outputs |
| A : Float64 | B : pure Float64<br>C : Float64 |
FIGURE 30
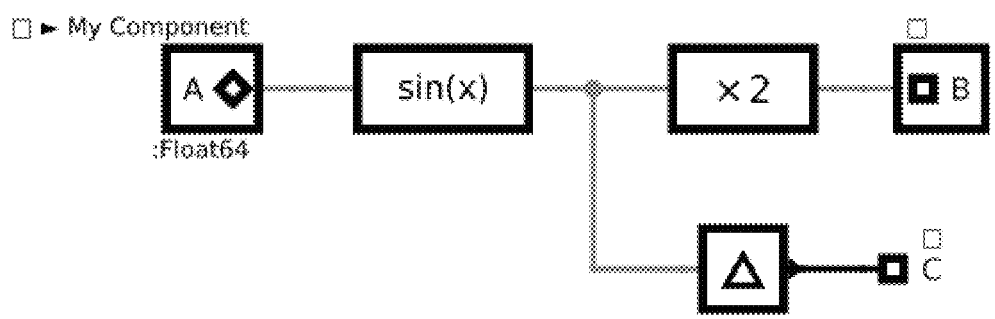
FIGURE 31

SOFTWARE TOOL FOR SIMULATING OPERATION OF HARDWARE AND SOFTWARE SYSTEMS

CROSS REFERENCE TO RELATED APPLICATIONS

This patent application claims the benefit of U.S. provisional patent application filed on Jan. 5, 2016 and assigned Application No. 62/274,977, which is incorporated herein in its entirety.

FIELD OF THE INVENTION

The present invention relates generally to software tools that access or edit information describing operation of hardware systems, software systems, or both hardware and software systems; and simulate operation of those systems.

BACKGROUND OF THE INVENTION

A modeling language uses specialized notation with specified semantics, such as diagrams or mathematical formulae, to define the behavior of a system. Such modeling languages can be used to specify and simulate the behavior of part or all of the logic in a software or hardware system. Examples of modeling languages include simple flowcharts and the vastly more complex Unified Modeling Language (UML), which is a general-purpose modeling language that has become an industry standard for specifying software-intensive systems. The UML has been standardized as ISO/IEC 19505:2012. OMG UML, ISO/IEC 19505 (2012).

Another common class of modeling languages are the dataflow languages, which describe the behavior of a system in terms of units (also called blocks, components, gates, etc.) and variables connecting them (also called networks, wires, connections, etc.). Two-dimensional graphical dataflow languages use notation similar to that used in circuit or logic diagrams to show the connections between units.

A common problem with tools for modeling and simulation is that large models are difficult to create initially as well as problematic to navigate once they have been created. It is also often difficult or inconvenient to find errors and issues, for example mismatching of variable names, type inconsistencies, incorrect assignment of constant values, or variables that are consumed without having been properly produced. Furthermore, it is inevitably necessary to update and modify a model over time; graphical modeling languages often make it difficult to analyze where changes occurred and the impact of those changes.

One common issue in particular with modeling languages is that it is often challenging to reuse logic in multiple situations. Reusing existing designs is desirable because it helps reduce development time and decreases the risk of errors. But for reuse to be effective, it must be possible to define a subsystem or group of logic only once no matter how many times it is reused, so that changes made in the single design propagate to all of the locations where it is used. Modeling languages often have limitations on the situations in which definitions can be reused, due to artificial constraints on data types, on atomicity (the ability to create loops in data flow), or on the appearance of a component (in visual modeling languages), which hinders the effectiveness of reuse.

Another issue in visual modeling languages is the overhead associated with manually laying out a diagram in 2D space. Often, the more complicated a model is, the more inconvenient this becomes. A particular issue in dataflow (circuit-style) languages is the need to manually position diagram input and output variables and specify information about their layout and direction of dataflow.

After a system has been modeled, the model can be simulated to ensure that it correctly implements the desired system behavior. One technique for verifying behavior of a system (or subsystem, or its constituent elements at any level of detail) utilizes a set of test vectors containing information such as initial conditions, timing, inputs, and expected outputs. Running the test vectors through any subsystem provides results indicative of the design and functional behavior of that subsystem.

When simulating a model of a system, in addition to testing with signal inputs that are expected during normal operation, abnormal inputs and internal states can be used instead. Testing under adverse input conditions such as these (sometimes referred to as "robustness testing") can improve confidence in system integrity. An issue with many models in formal languages is that it is difficult to create these abnormal states, because the behavior of the model intentionally constrains the system to only be in normal states with valid intermediate computations based on the system's inputs.

Black box testing and white box testing lie at the two ends of the testing spectrum. A pure black box test of the entire system, (or subsystems with the results stitched together to represent the system), provides real world inputs and looks at its real-world outputs. A white box test, on the other hand, normally focuses on a specific component or system requirement where the tester controls the internal variables, instead of relying on the real-world variables, to prove functionality. Both types of testing are useful, but modeling tools do not always make it easy to choose the scope of simulation in a model as one appropriate for the type of testing being conducted.

When simulating large models, performance is essential to the usability of a modeling environment. Rapid interactivity significantly improves the ease of finding errors and developing test data. Excessive memory usage can harm simulation performance due to memory management overhead and poor cache locality, as well as impairing the ability to run many simulations simultaneously in parallel.

BRIEF DESCRIPTION OF THE DRAWINGS

The skilled artisan will understand that the drawings, described below, are for illustration purposes only. The drawings are not intended to limit the scope of the present invention in any way.

FIG. 16 specifically shows this through selective highlighting.

FIGS. 26-29 illustrate exemplary diagrams for use in static analysis and simulation executed by the tool of the present invention.

FIG. 30 illustrates information a user can obtain from the tool about a component depicted in a diagram.

FIG. 31-33 illustrate exemplary diagrams for use in static analysis and simulation executed by the tool of the present invention.

DETAILED DESCRIPTION OF THE PREFERRED EMBODIMENTS

Before describing in detail the particular methods and apparatuses related to a software tool for modeling and simulating hardware and software systems, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The following embodiments are permissive rather than mandatory and illustrative rather than exhaustive.

The present invention relates to a software tool for modeling and simulating software and hardware systems. Certain features of the invention are embodied in a commercially-available tool referred to as the CertSAFE® software tool available from CERTON of Melbourne, Fla., assignee of the present application.

In one embodiment, the tool comprises a modeling language for use in creating a model of a software or hardware system and an integrated development environment (IDE), which is a software application for designing, navigating, and simulating models written in this language.

It is not necessarily required that a modeling and simulation tool, such as the CertSAFE® tool, include all of the features described herein. Thus, certain embodiments may include certain described features while other embodiments may include other features or exclude certain features.

The modeling and simulation tool presents an interactive interface where dataflow diagrams and other elements that represent a system form the basis of the simulation. Behavior of the simulated system provides information useful for identifying system problems and the root causes thereof.

The tool offers many advantages over the prior art, in particular the disadvantages of the prior art as described in the BACKGROUND section above. For example, this tool makes it significantly easier to navigate system models, allowing the proximate display of related information and allowing the user to quickly and easily identify system elements that are affected when new logic is added or when simulation data is modified. The tool also makes it significantly easier to design simulation input vectors and understand simulation results for complex systems.

Definitions

The following definitions may be helpful in understanding the modeling and simulating environment and its various elements as described herein.

Figure 1:
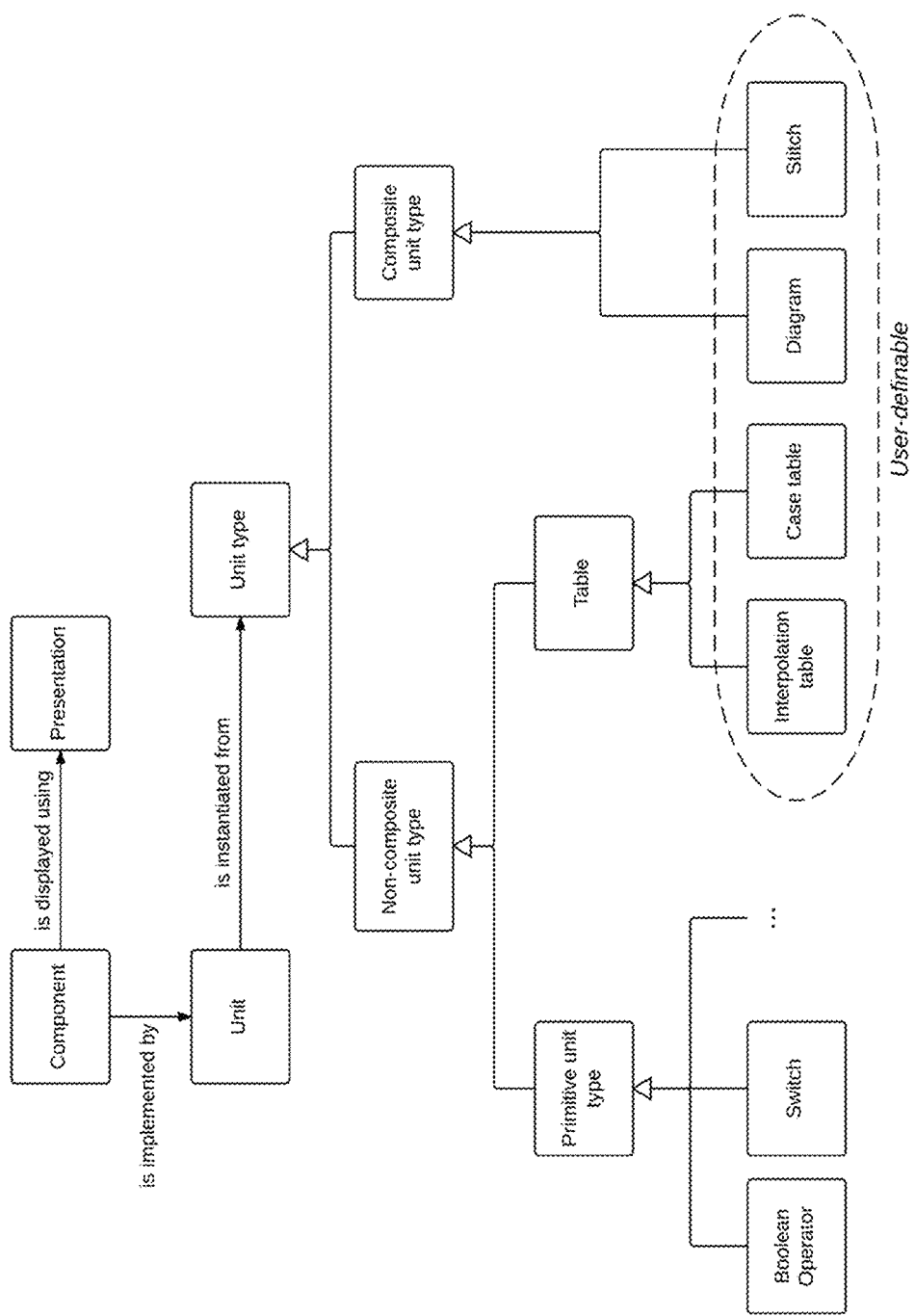
FIG. 1 illustrates the types of objects in the modeling and simulating system of the present invention and the relationships between those objects.

The FIG. 1 depicts various objects in the modeling and simulating systems and the relationships between those objects. These concepts are applicable to both the modeling aspect and the simulation aspect of the tool of the present invention.

In FIG. 1:

A box represents a class of objects, e.g., a primitive unit type is one class of objects and a case table is another class.

A model in the tool of the present invention can contain many "Units," as defined below, selected from one or both of non-composite unit types and composite unit types.

An open arrowhead represents an "is-a" relationship, e.g., every "Interpolation Table" is a "Table Unit Type" and every "Switch" is a "Primitive Unit Type."

A darkened arrowhead represents a general association, e.g., a system "Component" is implemented by a "Unit."

Generally, the diagram is similar to a UML (Unified Modeling Language) class diagram illustrating the relationships between various concepts. UML is an ISO-standardized and widely-understood notation, UML, ISO/IEC 19505 (2012).

An IntelliPoint (short for Intelligent Point) is a control point for values assumed by a simulation input (as described in co-owned U.S. Pat. No. 9,020,796, issued on Apr. 28, 2015, entitled Model Based Verification Using Intelligent Connectors, with inventors Amalfitano, Stockton, and Marot, and pending U.S. patent application Ser. No. 13/302, 537, filed on Nov. 22, 2011, entitled Verification of Signal Processing Using Intelligent Points, with inventors Amalfitano, Stockton, and Marot, both of which are hereby incorporated by reference in their entirety). An IntelliPoint consists of a specified value for a variable at a particular point in time, together with information for interpolating that value until the next IntelliPoint (time) is reached.

IntelliPoints are tools in the present invention that help the user create input vectors to a modeled system for use during a simulation. IntelliPoints represent a compact notation for expressing inputs the user wants to provide to the system during a simulation. The key concepts that characterize IntelliPoints are:

Each IntelliPoint is assigned to a single controlled variable, and the IntelliPoint parameters affect only that variable. In different embodiments, the variable could be selected by specifying a merged variable, or a single variable name out of the various names that refer to that merged variable.

A single controlled variable can have many IntelliPoints with each IntelliPoint determining the value of that variable during a different time interval.

An IntelliPoint has a time during which it is valid, a value, and an interpolation method (also referred to as a modifier) for determining subsequent values of that variable name during the validity period of that IntelliPoint. The interpolation method can be quite complex and may have many parameters.

The value of a controlled variable at a point in time is determined by the time, value, and interpolation method as applied to the immediately preceding IntelliPoint of the controlled variable. In some cases, the value of the controlled variable is also determined by the value of that controlled variable as set forth by one or more subsequent IntelliPoints. For example, if the interpolation method of the preceding IntelliPoint is a linear ramp, the final value of that ramp is controlled by the value at the next IntelliPoint. An N-th degree polynomial interpolation may be determined by the values of N+1 IntelliPoints.

A unique feature of the tool of the present invention is that a variable controlled by an IntelliPoint does not have to be an input to the model in the usual sense. That is, IntelliPoints can control variables that are not inputs of the simulation root (where the root is the top-most definition, serving as the entry point that contains all of the logic being simulated).

When an IntelliPoint is assigned to a variable that is not an input of the simulation root, it overrides the values that would have otherwise been computed by the model's logic for that variable during the IntelliPoint's time range, replacing those values with the values determined from the IntelliPoint interpolation. This is useful for experimentation, robustness testing, unit testing, and other situations where bypassing the normal behavior of a model's logic is desirable.

The concept of IntelliPoints is discussed further in the section on controlled variables and IntelliPoints below.

A Unit comprises logic functions associated with a system component. (In the vernacular of other simulation systems, a unit may be referred to as a block, gate, entity, node, stream transformer, or a variety of other synonymous terms). For simulation purposes a unit tells the simulator how to operate on inputs to the system component to produce outputs from the system component. Thus, a component is implemented by a unit. Units are the primary elements of the modeling and simulating environment of the present tool.

A Unit Type defines the nature of a unit, describing how each particular unit of that type will behave when simulated. For example, an "AND gate" is a unit type. A particular model might contain three AND gates in different locations of the system; in this case, each AND gate is a unit, all three of which share the same unit type, i.e., "AND gate".

There are two classes of unit types: composite unit types and non-composite unit types.

A Composite Unit Type is a unit type whose definition is given in terms of a collection of other units and the connections between them. A composite unit type comprises a collection of inputs/outputs and child units that are connected by variables passed between the inputs/outputs and child units. In other words, any unit type whose simulation behavior can be specified by a netlist, where the netlist specifies the child units and the variables connecting those child units, is a composite unit type. Possible kinds of composite unit type that an embodiment of the present invention may support include, but are not limited to, diagrams and stitches, as described below. See FIG. 1.

A Non-Composite Unit Type is any unit type that is defined independently without reference to other unit types. This contrasts with composite unit types, which define their behavior by connecting units of other unit types together. Possible kinds of non-composite unit type that an embodiment of the present invention may support include, but are not limited to, primitive unit types and table unit types, as described below. See FIG. 1.

A Primitive Unit Type is a non-composite unit type whose functionality is hard-coded into the modeling language and simulation engine. Primitive units are the basic building blocks of diagrams, and allow more complex pieces of logic to be constructed. They are similar to standard library functions in a computer language. Examples of primitive units are: Boolean logic gates, standard math functions, switches, summation components, and bitwise functions.

A Table Unit Type is a non-composite unit type whose behavior is defined by a finite table of data. Two kinds of table that an embodiment could provide include: interpolation tables, which define a numeric function by interpolation of a finite dataset, and case tables, which comprise multiple cases or branches in each dimension that are used as indices into the table to determine an output value from the table.

FIG. 1 also shows that operational attributes of the interpolation tables, case tables, diagrams and stitches are user-definable, as opposed to primitive unit types which are built-in to the modeling environment and cannot be modified by the user.

Other features of the software modeling and simulating tool of the present invention include the following.

An Instance Hierarchy is created when the tool recursively expands composite unit type definitions beginning at a user-specified simulation root. The non-composite unit types cannot be expanded since they represent fixed functionality (e.g., a primitive unit type) or fixed values (e.g. a table unit type). The instance hierarchy comprises non-composite units and variables that serve as interconnections between the non-composite units, where some of those variables may be inputs/outputs of the root. A unit within an instance hierarchy (either a non-composite unit or a recursively-expanded composite unit) is called an instance.

A Consumer is a user of values or an input to a unit (ether a composite unit or a non-composite unit). In the context of instances, it refers specifically to an input to a non-composite unit.

A Producer is a source of values or an output from a unit. In the context of instances, it refers specifically to an output of a non-composite unit.

A Diagram is a composite unit type developed in the tool that uses two-dimensional graphical dataflow notation to represent the child units and the variables connecting the child units. The diagrams comprise components and wires, with the components serving as the child units, and the wires representing variables and indicating how these variables are passed between units of the diagram.

A Diagram Object is an element that has a graphical representation and may be placed at a particular location in a diagram. Examples of diagram objects include components and wire segments. Different embodiments of the present invention may vary in what kinds of diagram objects they support.

A Stitch is a composite unit type that connects other composite units together as set forth in tabular notation. Essentially a stitch provides the same information as a diagram, where a diagram presents its information in a graphical two-dimensional notation and a stitch presents its information in a tabular notation.

A diagram definition or a stitch definition comprises child units and variables that serve as interconnections between those child units, where some of the variables may be input/outputs of the diagram or stitch.

A Component is a diagram object representing in graphical form a particular unit, giving the unit a visual appearance and layout for display and interaction purposes. A component has a presentation and an implementation. The Presentation describes the display and user interaction aspects of the component, including how the component is drawn, where its pins are positioned, etc. The Implementation defines the component's behavior and interaction with other system elements. In other words, the implementation of a component is the unit that the component represents in graphical form. The implementation of a component determines the data types and simulation behavior of that component.

There are three kinds of components: primitive components, custom components, and direct references.

Primitive components are built in to the modeling environment. A primitive component's presentation is hardcoded and not user-modifiable, and its implementation is a built-in primitive unit type as described above.

A custom component is a user-defined component with a user-defined presentation. Any unit type (such as a stitch, table, diagram, or primitive) can be used as a custom component, with its presentation and implementation defined in an associated component definition specified by the user as part of the model.

A direct reference is a user-defined component with an automatically-generated presentation. A direct reference component is used when a diagram definition references another unit type definition directly rather than referencing a component definition or a primitive component. Any unit type (such as a stitch, table, diagram, or primitive) can be used as a direct reference, with the tool programmatically generating a presentation with an automatic layout for the input and output pins of the component.

Within the present application, a Model is a collection of definitions obtained from one or more sources. A source may be, for example, a file on disk or a resource on a web server.

The term Definition potentially includes many types of notation specifying the functionality of a system. For the purposes of this application, the main kinds of definition that are relevant include:

Unit type definition: A unit type definition details the behavior of a single unit type. Examples include stitch definitions, diagram definitions, interpolation table definitions, and case table definitions.

Presentation definition: A presentation definition describes the appearance and layout of a component type.

Component definition: A component definition specifies the presentation and implementation of a single component type. A component definition references a presentation definition for the presentation and a unit type definition for the implementation.

The kinds of definition mentioned above are not the only possible kinds of definition, but are the only ones that need be defined for the present application. The aforementioned CertSAFE® software program that embodies some of the concepts of the present invention includes other kinds of definition in addition to those above, such as enum definitions that specify enumerated data types.

A single source of definitions may supply multiple definitions at once of the types mentioned above, in which case, for the purposes of this application, the source is considered to provide multiple definitions rather than a single combined definition including all of the information supplied by the source. For example, if a single file on disk describes two unit types, it is to be understood that the source provides two distinct unit type definitions rather than a single combined definition describing two unit types. Moreover, a definition may be split across multiple sources. For example, a pair of files on disk could combine to provide a single diagram definition. Different embodiments of the present invention may obtain the definitions constituting a model through different methods.

The user can select one of the unit type definitions in a model as a root. The tool then expands that unit type definition into an instance hierarchy for use during a simulation.

Figure 2:
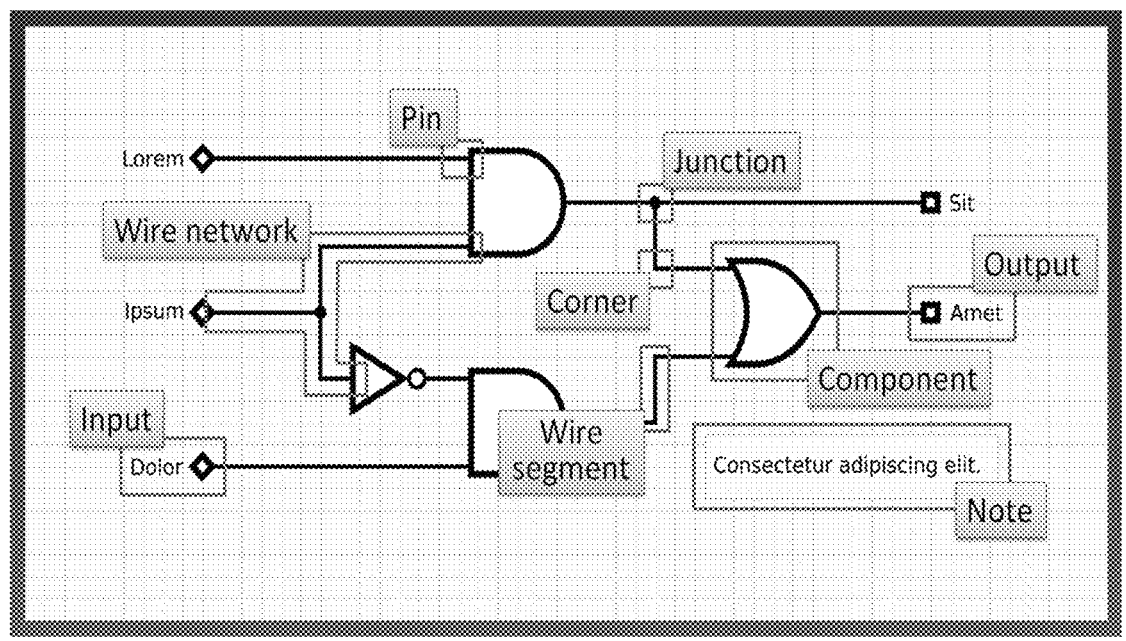
FIG. 2 illustrates an exemplary dataflow diagram and some of the types of objects that such diagrams may contain.

An exemplary diagram is illustrated in FIG. 2, including some elements that can appear in any diagram of the modeling and simulating tool of the present invention. An input to the diagram is indicated by a diamond symbol and an output from the diagram by a square symbol. The words and phrases shown in a block of FIG. 2 refer to the proximate figure element. Generally, each of the component inputs and outputs are considered pins. One exemplary pin is labeled "Pin" in FIG. 2.

A Wire Segment is a diagram object connecting two points in a diagram using a straight or curved path. A Wire Network is a maximal connected subgraph (in the sense of graph theory) of one or more Wire Segments within a diagram. That is, a Wire Network is a connected component of wire segments (where "component" here is the graph-theoretical term, not the term defined previously in this application). Collectively, wire segments and wire networks may be referred to as Wires.

Instances

The present invention allows the user to express large systems and manage their complexity. The concepts of definitions and instances as described above are particularly important.

A unit type definition, such as a diagram definition or interpolation table definition, specifies a behavior of a single unit type. A unit type definition is not instantiated until the user selects some unit type definition as the root. Then each unit type definition is instantiated zero or more times based on where it appears in the instance hierarchy.

When the user drags a unit type into a diagram in the tool's graphical user interface (GUI), a new unit is created. The new unit is a child unit of the diagram into which it was embedded, and this diagram includes a reference to the new child unit's unit type. Each child unit of a diagram (or of a stitch) has a child name, with the name automatically generated based on optional child name annotations set by the user. The child name is displayed in the GUI to identify that child.

A definition in the tool does not "do" anything by itself, any more than a function in an imperative programming language such as C can run itself. To simulate a system the user must instantiate a unit type definition by selecting a root definition from, for example, the GUI display. The root specifies the "top level" of the system; it represents the scope of instances that one is interested in working with. While in a C program the entry point for executing the software is always a function named "main", in the tool of the present invention the user can select any unit type as the root of a simulation. Returning to the C analogy, this feature is analogous to permitting the C programmer to simulate the execution of a C program starting from any function. The instance hierarchy generated from the root is analogous to the call hierarchy of the C program's entry point, with each child unit being analogous to a function call. Just as a single C function may be called at many different points in the call hierarchy, a single unit type definition may be instantiated at many different points in the instance hierarchy. And just as a C function body may call the same function multiple times, a composite unit type may have multiple child units of the same unit type.

Figure 3:
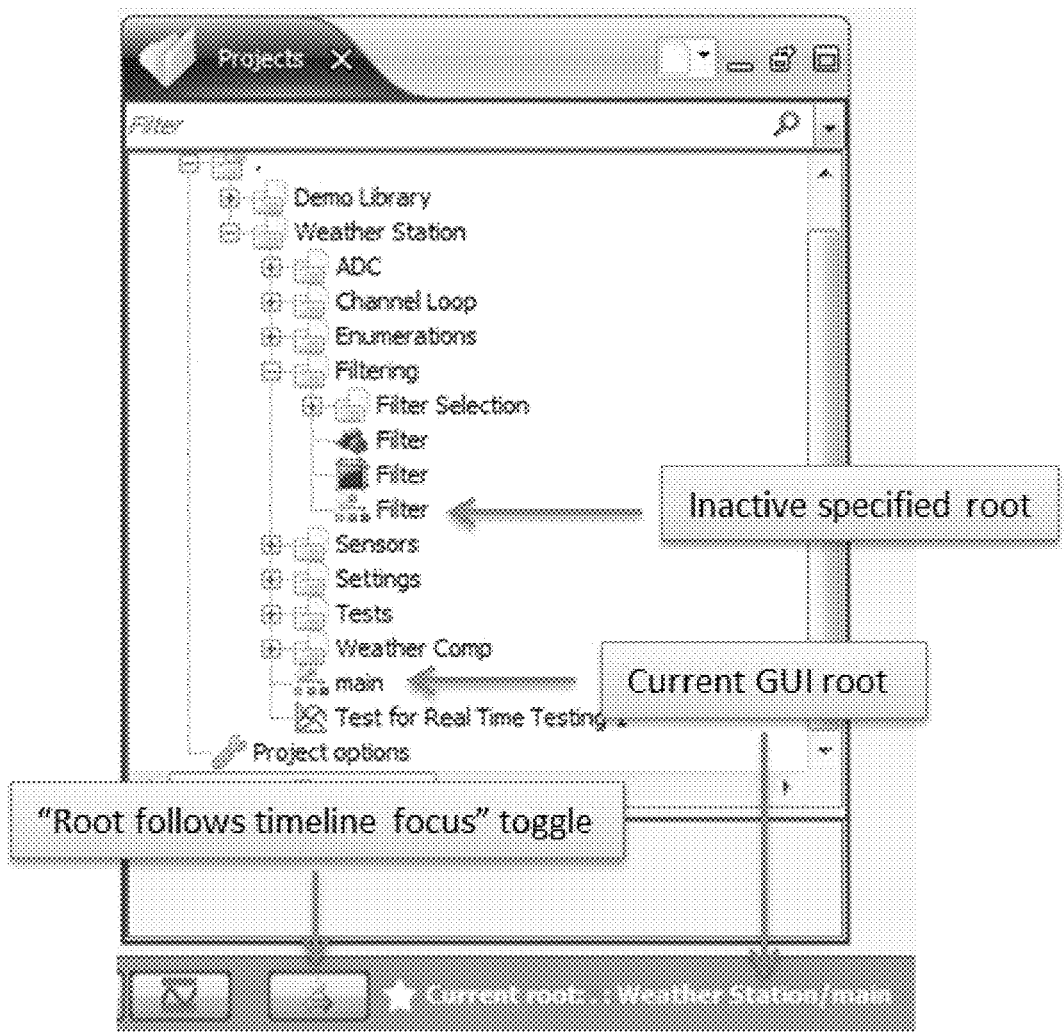
FIG. 3 illustrates a model containing multiple definitions, as well as GUI (graphical user interface) elements for viewing and controlling which definition is currently selected as the GUI root.

Once the user has selected a root, the selected root induces an instance hierarchy, which is the result of expanding all of the composite units in the root recursively. The user can navigate the induced instance hierarchy in the GUI using the Instance view, which shows the instance hierarchy as a navigable tree. See FIGS. 3 and 5. Also, the user can navigate to any element of the instance hierarchy using the breadcrumbs bar, which shows the instance hierarchy as a navigable breadcrumb component, similar to a breadcrumbs bar in file managers such as Microsoft Windows Explorer. See FIG. 4.

At any time, the tool can accommodate only one active root, called the GUI root, to be displayed in the GUI. The GUI root is used to populate the instance tree, breadcrumbs bars, etc. Each simulation also has a root, which defines the subsystem to be simulated. The GUI root changes to the simulation root if that simulation is focused and the "root follows simulation editor focus" toggle button in the GUI is toggled on. There is also a notion of specified root, which is a definition selected by the user in a model, which becomes the GUI root if no simulation is focused, or if the "root follows simulation editor focus" button is toggled off. See FIG. 3.

Instance Mode

When viewing or editing a unit type definition, the tool of the present invention distinguishes between Definition Mode and Instance Mode. In Definition Mode, the unit type definition is displayed without viewing any particular instance within an instance hierarchy. In Instance Mode, a particular instance of that unit type within the current GUI root is selected for viewing.

In one embodiment, in response to a user double-clicking on an instance path in the Instance view, the tool will open the definition of the unit type of that instance in instance mode, with the specified instance selected for viewing.

Figure 4:
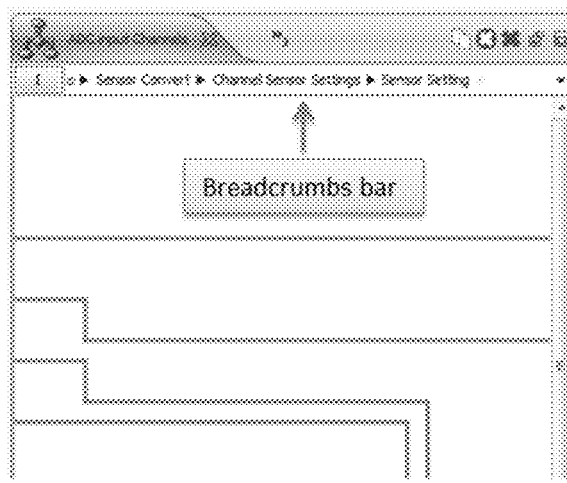
FIG. 4 illustrates a breadcrumbs view of an instance hierarchy.
Figure 5:
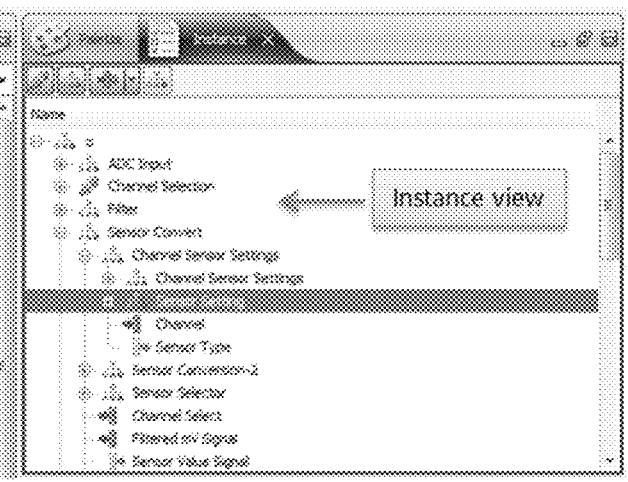
FIG. 5 illustrates an instance tree view of an instance hierarchy.

In an embodiment illustrated in FIG. 4, the tool supports toggling between definition and instance mode while viewing a unit type definition by pressing the "D/I" button at the top-left of the editor tab, or by pressing a keyboard shortcut. This embodiment also includes a drop-down menu listing all of the instances within the current GUI root of the unit type definition being viewed, from which the user may select an item to select a different instance path for viewing.

Note that some embodiments may support viewing multiple unit type definitions simultaneously in the user interface, or viewing the same unit type definition multiple times simultaneously in the user interface. Such embodiments may or may not have separate Definition Mode/Instance Mode states for each occurrence of a unit type definition being viewed at a particular point in time.

Diagrams

In the tool of the present invention, a diagram alone is not, strictly speaking, a model of a system. The diagram may reference other unit types and data types, and the definitions for these referenced elements (and any definitions they reference, transitively) are needed to provide the information necessary to perform a simulation.

Another point to emphasize is that a diagram may represent a subsystem or reusable component rather than a complete system. The tool software does not distinguish these cases. For example, when a user sets a diagram as the current GUI root, that diagram becomes the top-level system for the instance hierarchy displayed in the user interface, regardless of whether the diagram is also a subsystem of a larger system.

The distinction between definitions and instantiated roots is also important. Even if the user has all the definitions referenced directly or indirectly within a model, she does not have a simulatable system until she chooses a root, after which the tool builds an instance hierarchy from that root and includes all of its children. This feature is apparent from many aspects of the tool's design, beginning with the distinction between a definition and an instance.

A definition, such as a diagram or stitch definition, may reference other definitions. These latter definitions can in turn have references to still other definitions. Also, any definition can have multiple definitions that reference it, and a first definition may reference a second definition multiple times. In the terminology of graph theory, definitions and the references between them form a directed acyclic multigraph, where the definitions are the vertices and the references are the edges.

Instances, on the other hand, form a hierarchy with a root and parent/child relationships extending from that root. In the terminology of graph theory, an instance hierarchy is a rooted tree, where the instances are the vertices and the parent/child relationships are the edges.

Figure 6:
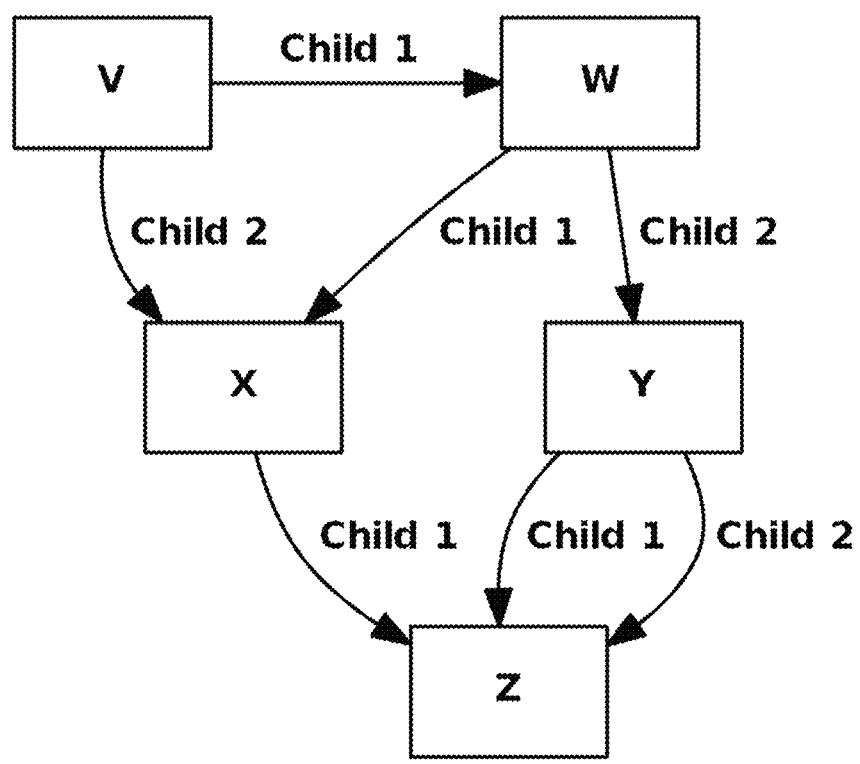
FIG. 6 illustrates a graphical representation of a model containing multiple unit type definitions which contain references to other unit type definitions in the model.

FIG. 6 shows a graphical representation of a simple model (i.e., a collection of unit type definitions). Each box represents the definition of a unit type. For example, "V", "W", "X", "Y", and "Z" might be names that each represents a definition of a diagram unit type. Each arrow in FIG. 6 points to a child unit reference. The start of an arrow indicates the definition making the reference (e.g., the definition of unit type V) and the end of the arrow indicates the definition being referenced (e.g., the definition X is referenced by the definition V, and the definition V references the definition X). The label (e.g., "Child 2") indicates the child name as it would be displayed in the tool's GUI.

Note that multiple definitions can have a unit of type Z as a child (e.g., both of the unit types X and Y reference the unit type Z). The effect is that all of the unit types V, W, X, and Y directly or indirectly depend on the unit type Z. Note the distinction between references and dependencies: X and Y have direct references to Z, while V and W only have indirect (transitive) dependencies on Z.

A single definition can contain multiple child units of type Z (e.g., the definition Y references the definition of unit Z twice).

Figure 7:
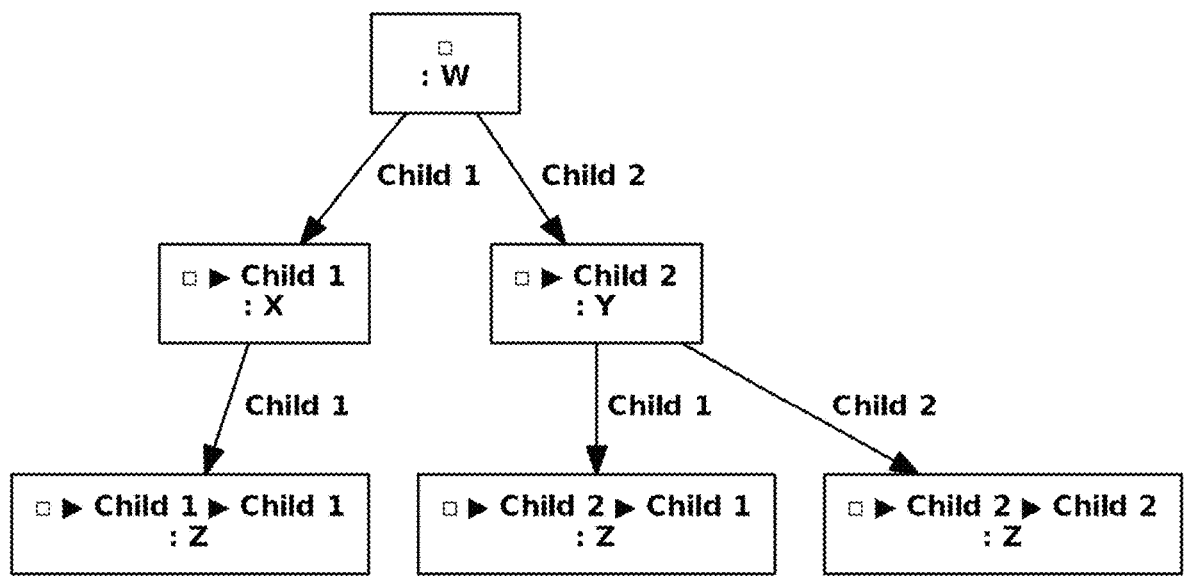
FIG. 7 illustrates an instance hierarchy instantiated from the definitions in FIG. 6.

If, in the FIG. 6 example, a user selects unit type W as the root (this selection is an operation the user can perform from the tool's GUI), the tool constructs an instance hierarchy as shown in FIG. 7, to be described below.

Generally, in the figures associated with the present invention, an open square symbol indicates an instance root, and a right-pointing arrow symbol is a path separator indicating that the right-hand side unit is a child of the left-hand side unit. For example, the notation "□▶Child 2 ▶Child 1" can be read as, "the unit named 'Child 1', which is in the unit named 'Child 2', which is in the current root." A colon means that the type of the element on the left-hand side is the same as the type given on the right-hand side. The colon is understood to have lower precedence than the arrow, so that the expression "□▶Child 2▶Child 1: Z" means that the entire left-hand path "□▶Child 2▶Child 1" denotes a unit whose unit type is Z.

FIG. 7 presents the instance hierarchy constructed from the model shown in FIG. 6 if the definition W is selected as the root. For example, in FIG. 7, the central box on the bottom row indicates that from the root (the open square representing the unit of type W in this case), a unit of type Z can be reached as follows: start at the root unit of type W; navigate into Child 2 to arrive at a unit of type Y; and then navigate into Child 1 to arrive at a unit of type Z.

FIG. 7 represents an instance hierarchy structure that can be displayed and navigated using the Instance view and the breadcrumbs bar, as described above. But FIG. 7 depicts this path in a two-dimensional format, whereas both the instance view and the breadcrumbs bar present the same information in a single-dimension tree or list. Because in FIG. 7 there are multiple references to the definition Z reachable from the selected root, the instance hierarchy contains multiple units (three) of type Z.

Recall above that it is assumed Z is a diagram unit, thus when viewing the diagram Z in instance mode (see FIG. 5 for an example of an instance view) the instance view drop-down menu lists all three instances of type Z, and thereby permits the user to switch between them.

Instance Paths

In an instance hierarchy, merely listing the child name or variable name given in the definition is not always sufficient to provide a unique identifier for the instance hierarchy. Instead, the tool uses instance paths to uniquely name elements within an instance hierarchy. Instance paths can be either instance child names, which identify a unit within an instance hierarchy, or instance variable names, which identify a variable name within an instance hierarchy.

An instance path starts at the instance root and lists all of the children that must be stepped into to arrive at the named element (i.e., the end of the instance path).

The GUI Instance view (see FIG. 5) depicts an instance tree showing all instance paths for the current path root and allows the user to navigate to and inspect each of those paths.

There are also inline-notation elements for instance paths; these elements are used in the breadcrumbs bar and other elements of the GUI.

For instance child names the notation comprises:
the symbol □, denoting the root of the path, followed by zero or more of
 the symbol ▶, followed by
 a definition child name.

For instance variable names the notation comprises:
an instance child name, followed by
the symbol •, followed by
a definition variable name.

Figure 9:
FIGS. 9-14 illustrate exemplary diagrams for use in static analysis and simulation executed by the tool of the present invention.

For example, an Instance path in a diagram is shown in FIG. 9 and assigned the name "Internal."

Figure 10:
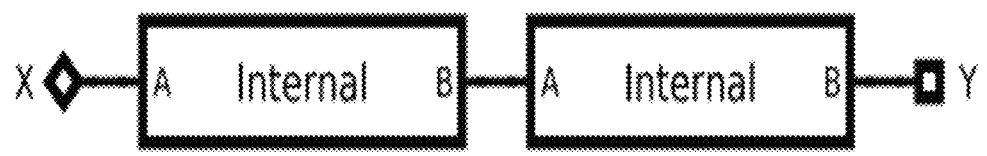

A diagram named "External" is defined as shown in FIG. 10.

Further, suppose that the left-hand Internal block in FIG. 10 has the definition child name "Internal 1" and the right-hand block has the definition child name "Internal 2." Assume External is set as the current root, then some of the instance paths in this root include:
 "□"—the root unit
 "□▶Internal 1"—the left-hand instance of Internal
 "□▶Internal 2"—the right-hand instance of Internal
 "□•X"—the input of the root unit
 "□▶Internal 1 •B"—the output of the left-hand instance of Internal
 "□▶Internal 2•B"—the output of the right-hand instance of Internal Differences Between Two Diagrams The tool of the present invention has a feature that allows the user to visually compare two diagrams to see the differences between them. This feature is very useful for version control, change tracking, and impact analysis purposes.

Figure 8:
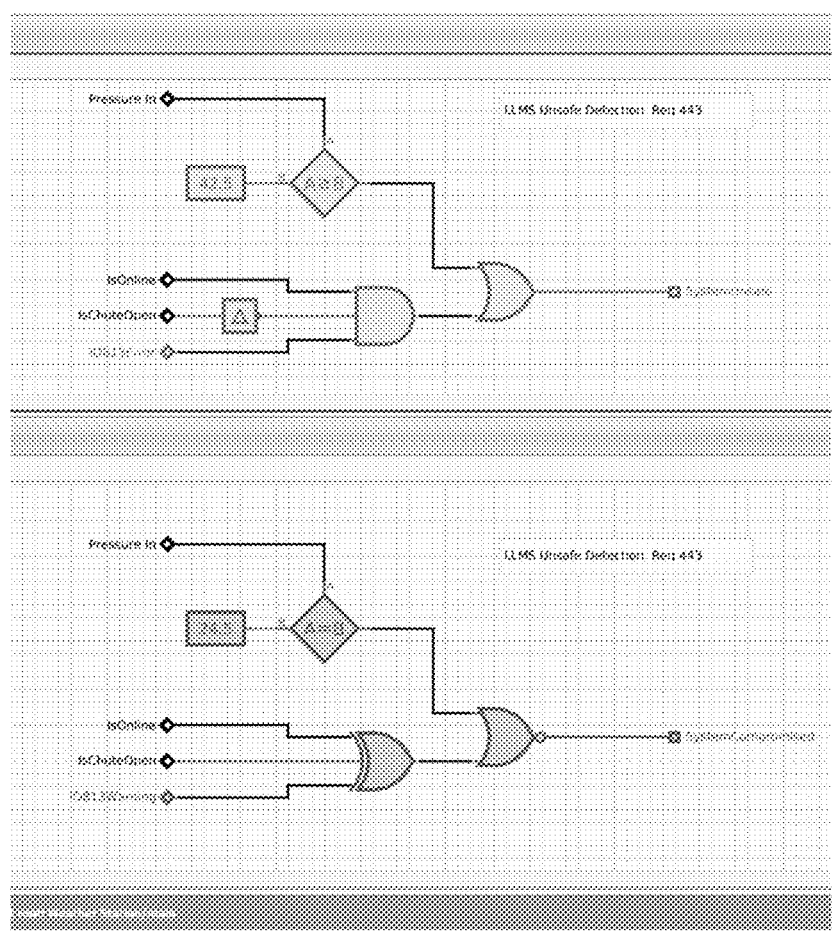
FIG. 8 illustrates a method of displaying the differences between two diagrams.

The tool shows diagram differences by displaying a pair of diagrams highlighting the diagram objects that were added, removed, or moved between the diagrams (see FIG. 8). The tool uses a different color highlight for each of these three types of differences, i.e., added, removed, and moved. This comparison feature works on any pair of diagrams, regardless of whether they are different versions of an earlier diagram or separate diagrams that were independently created, and regardless of the sources from which the two diagram definitions were obtained.

The user can edit the two diagrams that are compared, and the tool updates the diagrams as the user performs the edits, highlighting in real time the current differences between the diagrams.

When determining whether a diagram object was added, removed, or moved, the tool examines the relationship of the objects in the diagram and attempts to find groups of multiple objects that are similar between the two diagrams. One factor that the tool considers when searching for matching objects is the relative spatial relationships of the objects in the diagrams.

Components

A component in the tool of the present invention is a unit in a diagram, shown as a labeled box or another geometric shape. A component has two attributes, the presentation of the component (a symbol used to display the component on the GUI) and the implementation (functionality) of that component.

The presentation attribute of a component determines its appearance, such as rectangle size and the locations of its pertinent labels and pins.

The implementation of a component determines its static signature. The static signature specifies the component's inputs, outputs, data types, etc. in a static (i.e., before any simulation has occurred) fashion. The implementation of the component also determines the component's runtime behavior during a simulation. Unlike many other dataflow modeling tools, the tool of the present invention allows the user to specify the presentation and implementation as two distinct definitions, and then create a component that combines both the selected presentation and implementation. This feature permits a user to create multiple components with the same implementation but different presentations, or multiple components with the same presentation but different implementations, both of which are useful in certain situations when modeling a system.

It is commonly desirable to use a certain unit type definition as a component in only one or a small number of locations in a model. In this case, it is unnecessarily tedious for the user to design a presentation and link the presentation and implementation together to form a custom component. The tool of the present invention supports the concept of a direct reference component, which is a component formed from a unit type by automatically generating a presentation with suitably-positioned input and output pins. A diagram containing a direct reference component references the unit type definition implementing the component, rather than referencing a component definition. This spares the user from having to manually create a presentation definition and component definition for components that will only be used a small number of times and for which a generic, automatically-generated presentation is acceptable.

Variable Merging and Canonical Names

Figure 11:

FIG. 11 illustrates an example diagram that has an input "A" connected to an output "B" with no functionality between the input "A" and the output "B". Normally, in a diagram different names refer to different variables with different values, but these two names will clearly have the same value when the system is simulated.

Thus, it is equally valid for the tool to interpret "A" and "B" not as different variables that always have the same value, but rather as two different names for the same variable with a single value. In effect, there is a single variable, referred to as a merged variable, that may be referred to under two different names. For many purposes, this subtle distinction is irrelevant. However, it may have important effects in the user interface and when controlling intermediate variable names during simulations.

Any time multiple variable names are joined by wires, as in FIG. 11, the tool merges all the multiple variable names into one merged variable that can be referenced under any one of the multiple names.

The tool also merges multiple uses of a single variable name in a diagram in the same fashion. The effect of this is that multiple wire networks will refer to the same merged variable if there are variable names shared between them. This is equivalent to saying that any wire networks that share a variable name in a diagram behave as if there were additional wire segments joining them into a single wire network.

An example of this is illustrated in FIG. 40, where the variable named "pi" is produced at the top of the diagram and consumed in a different location at the bottom of the diagram. The shape adjacent to the name "pi" is shown as a filled circle rather than a hollow diamond or square. This indicates that the variable name "pi" is local to the diagram rather than being an exported name (input or output) of the diagram. The aforementioned merging of wire networks sharing a name within a diagram also works with diagram inputs and outputs, so that it is possible, for example, to use the same diagram input in multiple locations within a single diagram.

Flattening

Figure 12:
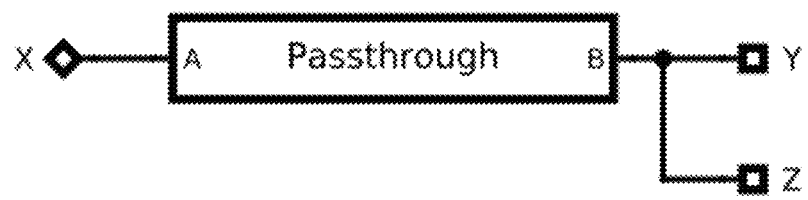

FIG. 12 illustrates how variable merging interacts with instance hierarchies. The child unit labeled "Passthrough" in FIG. 12 is assumed to be implemented by the diagram illustrated in FIG. 11. If FIG. 12 is the instance root, then all the instance variables names "□▶Passthrough•A", "□▶Passthrough•B", "□•X", "□•Y", and "□•Z" refer to the same merged variable within the instance hierarchy. The value of one cannot change without the others changing identically, so they are considered different names for the same merged variable.

Treating variable names in this fashion allows us to think about instances in a simple way. Instead of a hierarchy of definitions referencing each other, we can pretend that the tool expands out the instances within an instance hierarchy into a single flattened model. In our hypothetical flattened instance hierarchy, all composite units, e.g., diagrams and stitches, are recursively expanded out until they are completely replaced with the non-composite units that compose them. ("Flattened" here refers to the fact that such a recursively-expanded instance hierarchy has only two levels: the root, and the non-composite leaves.) In principle, any root could be expanded out in this fashion into a single large diagram containing only non-composite units.

In such a flattened system, it would be convenient if every unit and variable in this flattened system had a unique name, forming a complete description of the behavior of the model with no redundancy. For units, we can use the instance child name as a unique identifier. For example, in the system above we have two units, named "□" and "□▶Passthrough". Since both are composite units, neither would be retained in a flattened model, but instead would be replaced by the non-composite units that make them up. Since this model in fact contains no non-composite units at all, the flattened model would consist simply of a single merged variable, which may be referred to by any of the five instance variable names "□▶Passthrough•A", "□▶Passthrough•B", "□•X", "□•Y", or "□•Z".

Canonical Names

Choosing unique names for variables in a flattened system is somewhat more complex than for units because, as described above, a single merged variable can have many names throughout the instance hierarchy. The tool of the present invention automatically chooses a canonical name to serve as a unique identifier for each variable name in an instance hierarchy.

Figure 13:
Figure 14:
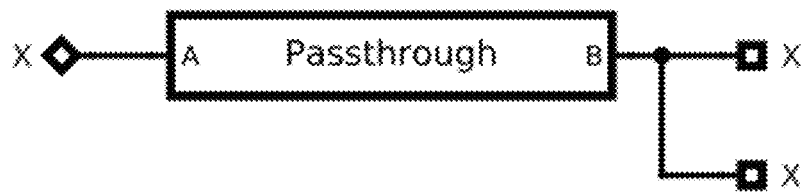

As shown in FIGS. 13 and 14, in the instance mode the tool displays the canonical name ("X") of each variable in a composite unit definition, rather than displaying that variable's name from the original definition. There are multiple methods by which a suitable canonical name may be selected from the set of all available names for a given merged variable. One class of methods selects a canonical name from the names used at the highest level in the instance hierarchy where the variable is referenced; that is, it selects one of the names with the shortest instance path prefix length. Selecting one of these top-level names usually gives the most informative and helpful result.

In the example of FIGS. 13 and 14, the tool has selected "□•X" as the canonical name for the single variable name in the model, and displays all of the inputs/outputs in both figures with the name "X".

This feature is helpful when navigating a complex model, since the user can tell when the same variable is referenced in multiple places, even if the definitions use different names.

Figure 15:
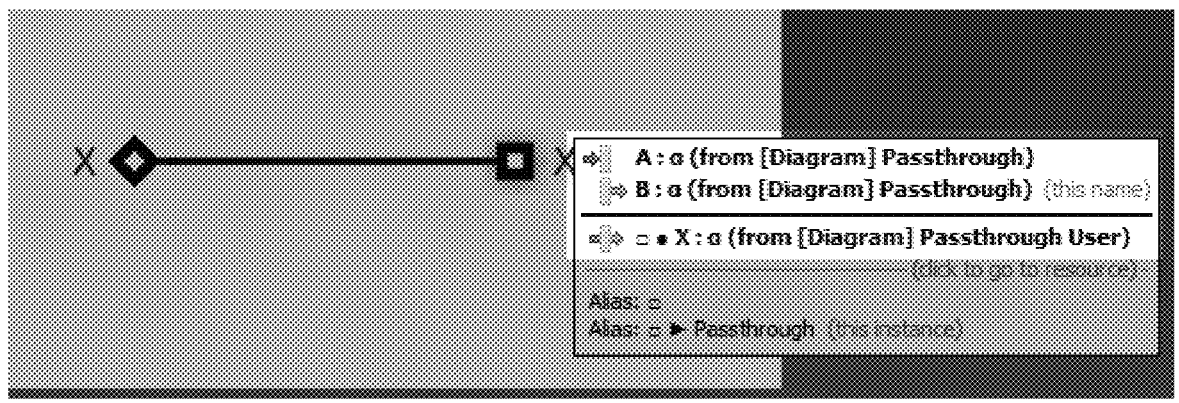
FIG. 15 illustrates information a user can obtain from the tool about a variable name.

As shown in FIG. 15, the tool displays several kinds of information about a specified variable name in instance mode upon request by the user. This information includes a list of all of the names in the unit instance that refer to that merged variable, together with their corresponding definition-local data types of the variable name. In one possible embodiment of this feature, the tool might display this information when the user hovers the mouse cursor over the variable name for which they desire to see this additional information.

Controlling Variables with Multiple Names

While a merged variable can have many different names, each merged variable has only one value at any time during a simulation. However, when the user creates a simulation, the tool displays information based on the particular names that have been dragged into the simulation timeline. One effect is that the same merged variable can be present in a simulation file under multiple different names, but the same value is associated with each one of the different names. But the user can control only one of these names, since all the names refer to the same underlying merged variable.

Attempting to control more than one name associated with a single merged variable will cause the tool to generate an error message, "This simulation contains conflicting controlled names" at the bottom of the timeline.

Producers and Consumers

In a composite unit type, variables are produced and consumed by child units. A child unit that takes a variable as an input is considered a consumer of that variable. A child unit that outputs a variable is considered a producer of that variable.

A variable can only have only one producer (a connected child unit output), but it can have any number of consumers (connected child unit inputs). The tool generates an error message for any variable that has consumers but no producer (since a value is generated but not used), and for any variable that has more than one producer.

There are several special primitive components that can be used in a diagram to control how variables are produced and consumed. An input/output (I/O) primitive component assigns an exported name to a variable so that values can be passed in and out of the diagram. As described more completely elsewhere herein, an exported name is one that is visible and used outside of the unit type defining it. A local name is used only within the unit type defining it.

The set of pins (i.e., input and output ports) that appear on a custom component made from a diagram are determined by the I/O primitives in the diagram. More generally, the set of pins that appear on a component equals the set of exported names of the unit that serves as the component's implementation.

Producers and consumers exist on two different levels in the tool. At the first level, the tool evaluates the rules associated with producers and consumers as described above and generates errors and warnings within each definition as appropriate. These rules are evaluated only within the composite unit definition (i.e., at the definition level), using only the information in the definition and any definitions it directly references.

Figure 16:
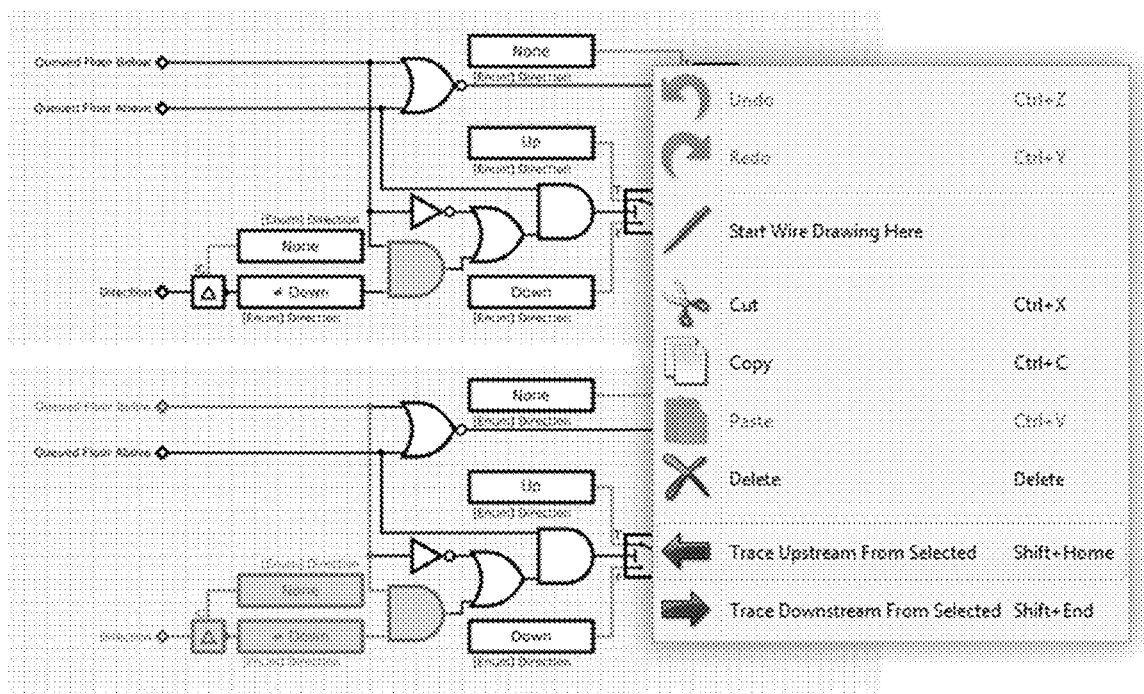
FIG. 16 illustrates a method of producing a set containing all logic in a diagram responsible for producing an intermediate signal in the diagram.

The tool provides features to help the user understand producer/consumer relationships within complicated diagrams. For a given diagram object (or a selected group of diagram objects) in a diagram, the tool provides the user with options to "Trace Upstream From Selected" and "Trace Downstream From Selected". Choosing "Trace Downstream From Selected" selects everything that uses the values produced by the selected diagram objects, and everything that uses the values produced by those, and so on transitively. Choosing "Trace Upstream From Selected" will do the reverse, selecting everything that is needed to produce the values of the selected diagram objects (see FIG. 16). For complex diagrams, including diagrams that use local variables, this feature provides a method of quickly determining what is and what is not relevant to a particular piece of logic.

At the second level, there is also a notion of producers and consumers at the instance level in the tool. For any merged variable in a model (assuming an error-free model), the value of the merged variable must come from either a non-composite unit (e.g., a primitive or a table) or as an input of the instance root.

Similarly, that value can be used to compute other values only where non-composite units consume the merged variable.

A non-composite unit that creates the value of a merged variable is called the producer of that variable, and a non-composite unit that uses the value of a merged variable is called a consumer of that variable.

If a composite unit references a merged variable but does not have a non-composite child unit that produces or consumes the variable, it is called an alias, because the variable is merely being passed around under different names without any computation actually being performed.

Figure 17:
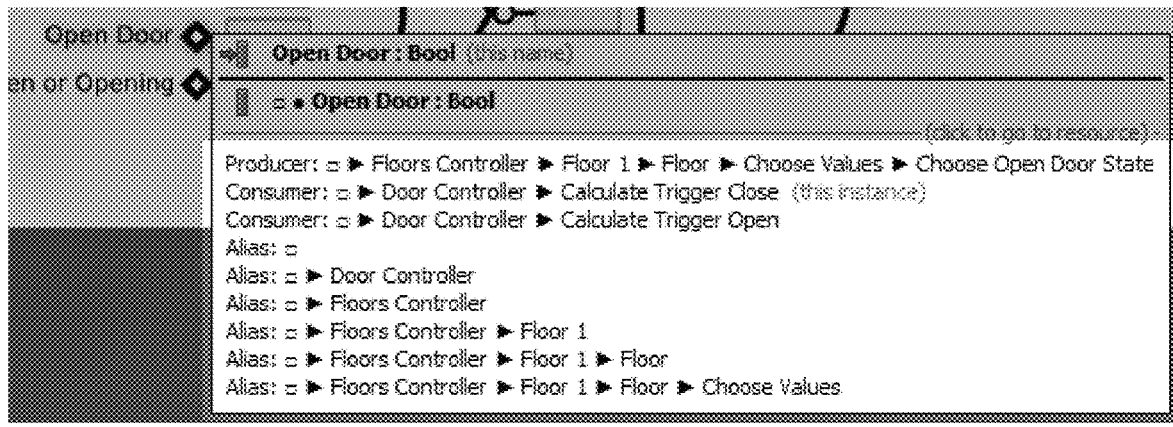
FIG. 17 illustrates additional information a user can obtain from the tool about a variable name related to how the name is used within an instance hierarchy.

As illustrated in FIG. 17, for a given instance variable name (such as a variable name displayed in an instance mode diagram, or displayed in an instance view), the tool can determine the merged variable to which that variable name refers, then display a list of the composite unit instances that contain any instance variable name that refers to that same merged variable. These are categorized in the displayed list as one of "Producer", "Consumer", "Alias", or "Producer/Consumer", as follows.

- A "Producer" instance is an instance that contains a non-composite unit that produces the merged variable.
- A "Consumer" instance is an instance that contains a non-composite unit that consumes the merged variable.
- An "Alias" instance is an instance contains no non-composite units that produce the merged variable and no non-composite units that consume the merged variable, and therefore only passes the merged variable around without itself performing any logic operations on that merged variable.
- A "Producer/Consumer" instance is an instance that contains a non-composite unit that produces the merged variable and one or more non-composite units that consume the merged variable. The same non-composite unit may both produce and consume the merged variable.

The list of composite unit instances containing names referring to a chosen merged variable, as described above and illustrated in FIG. 17, is the fastest technique for navigating an instance hierarchy across data dependencies, since each item in the list allows the user to navigate to that instance. For example, in one possible embodiment of the invention, if the user sees a variable and does not know where it is produced, she can simply mouse over the variable (or request that information using a different action, such as executing a mouse left button click on the variable) and then click on the "Producer" entry to go directly to the diagram that actually computes or produces the variable's value.

Figure 18:
FIG. 18 illustrates icons associated with producer/consumer relationships.

The tool also displays icons (referred to as variable usage icons) and other visual cues to help the user understand the producer/consumer relationships among variables in the system model. These icons are displayed adjacent to the name of the variable in the Instance view, simulation timeline, tooltips, and other displays. The icons are shown in FIG. 18.

These icons encode information about producer/consumer relationships among the variables. In definition contexts, the icon tells the user about the particular variable name displayed. For example, a blue arrow pointing into a small box from the left indicates that the named variable is an input to the composite unit in which the icon is contained. A pink arrow pointing out from the box to the right, indicates that the variable is an output from the composite unit in which the icon is contained. If the box is highlighted green, the variable is consumed by some child unit of the containing composite unit.

In the instance context, on the other hand, the icon tells the user about the merged variable denoted by the name in the display. If there is a blue arrow pointing into the box from the left, the merged variable is an input to the root unit under some name. If there is a pink arrow pointing out from the box to the right, the merged variable is an output of the root unit under some name. If the box is highlighted green, the merged variable is consumed by some non-composite unit in the instance hierarchy.

A closely related feature of the tool is that, in the instance mode, an input/output in a diagram is highlighted blue if that merged variable is an input or an output of the root unit under some name.

Figures 19, 20:
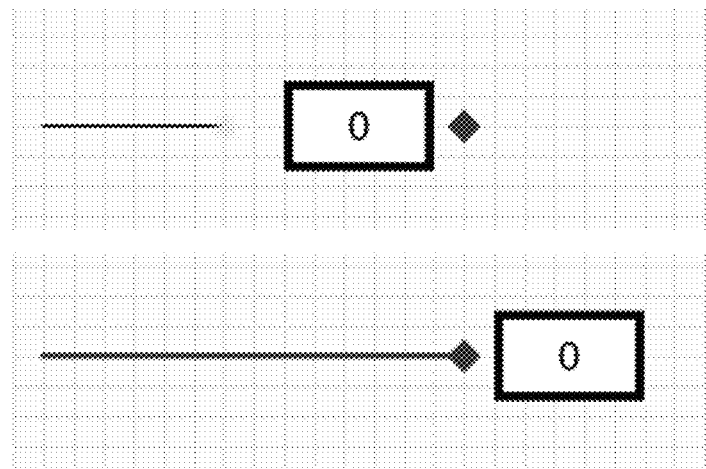
FIG. 19 illustrates display features associated with variable names.
FIG. 20 illustrates reorientation of an omnidirectional component when connecting a wire to the component.

In the example depicted in FIG. 19, the variable names that begin with the text "Floor 1" are merged with outputs of the root unit, while the other variables in FIG. 19 are not outputs of the root and are consumed elsewhere instead.

I/O-ness Inference

The preceding sections have presented material related to name merging as if it makes sense to assign certain names as inputs or outputs of a diagram, even if multiple such names are merged together. This concept is somewhat strange, though: if several names are referring to the same variable, in what sense is one name more of an input and another more of an output relative to the components of a diagram?

The tool eliminates this confusion by unifying diagram/stitch inputs and outputs into a single concept of an exported name. An exported name is one that is visible outside of the composite unit type defining it. When a first composite unit definition, such as a diagram or stitch, is used as a custom component in a second diagram, exported names declared in the first definition appear as pins (ports) of the custom component in the second diagram.

The opposite of an exported name is a local name, which is visible only within a single definition of a composite unit type and does not appear as a pin or port if that composite unit type is used as a custom component.

The tool imposes a rule that a variable must have exactly one producer. Thus, in order to enforce this rule statically, it is still necessary to label exported names as inputs and outputs. Importantly, though, the user is no longer required to do this manually. As long as a variable in a composite unit type definition has only one name that is marked as exported, the tool automatically determines whether that name should behave as an input or output using the following rules:

If the variable is produced by a child unit within the composite unit type definition, then the exported name is an output.

Otherwise, the exported name is an input.

This strategy will always choose the option that makes the composite unit type definition legal, if one exists.

Furthermore, it is never possible for both options to result in a legal definition for a name. This means that the step of forcing the user to mark a name as an input or an output is redundant; this information can be determined by the software with no ambiguity and with no user input.

Richer information can be obtained by breaking down the status of exported names into finer subdivisions. The tool assigns each network and exported name in a definition one of four categories:

Input, unused: the variable name is produced outside the definition and is not used at all within the definition. Under this condition the tool generates a warning.

Input, terminated: the variable name is produced outside the definition and is not used within the definition, but the user has added a special Terminator component to suppress the "unused" warning referenced above.

Input, consumed: the variable name is produced outside the definition and is used within the definition.

Output: the variable name is produced within the definition.

These categories form a total order, with "Input, unused" as the least element and "Output" as the greatest element. The category of a variable is the maximum of the categories of the connected child pins under the above order, defaulting to "Input, unused" if the variable is not connected to any child pins.

The category of an exported name is the same as the category of the variable the name is connected to.

The description above only covers the case with a single exported name per variable. The case of multiple exported names on a single variable can occur in diagram definitions if the user inputs a wire network with multiple variable name components connected to the wire network. The tool handles this case identically to the single exported-name case described above by first performing an exported name merging step. Rather than operating on the actual names declared by the user, the tool performs the following operation: for each network with at least one exported name, take all of the exported names on that network and group them into a single virtual exported name. (This process may require the use of a union-find data structure or similar merging operation.) After the exported names are grouped into virtual exported names, the I/O-ness inference process described above can be performed on the virtual exported names.

A side effect of the exported name merging operation is that multiple exported names in a definition can refer to the same variable. This can have strange consequences. For example, two different exported names A and B may both be considered "inputs", but connecting a producer to A eliminates the need to provide a value for B. This situation would occur if A and B are merged exported names. In such cases, it is clearer to think of the virtual exported names as being the entities assigned "input" or "output" status, rather than the names specified by the user.

Other embodiments of the tool avoid this issue entirely by prohibiting, under any circumstances, a composite unit type definition from containing multiple distinct names for a single variable within that definition. This restriction substantially reduces the complexity of the previously-discussed rules for variable merging, canonical names, and I/O-ness inference. These concepts are still relevant (for example, the user still cannot control a single instance variable under multiple instance names), but both its software implementation and the user's mental model are substantially simplified.

Omnidirectional Diagram Objects

One of the inconvenient aspects of diagram-based dataflow modeling tools is the overhead added by drawing wires and laying out diagrams to express logic. It is important that the modeling tool eliminate as much of this overhead as possible to maximize the user's productivity. The present tool accomplishes this objective by eliminating the need for the user to specify the rotation or orientation of certain diagram objects that have only one pin. In one embodiment, these omnidirectional diagram objects include variable names (diagram inputs, outputs, and local variables), constant literals (i.e., like a numeric literal but more generalized in that a constant literal can refer to numeric, Boolean, and enumeration literal constants), global constants, and other special components. When the user connects a wire to an omnidirectional component's pin, the tool automatically reorients the component's body to avoid overlapping the connected wire with other connecting wires or with other components. This feature spares the user from having to perform this action manually. An example of this is shown in FIG. 20.

The tool of the invention uses a heuristic to try to find the best place to position the body of an omnidirectional component without overlapping nearby logic. The tool examines the four cardinal directions (top, left, bottom, right) and four intermediate diagonal directions (top-left, top-right, bottom-left, bottom-right) when searching for the best position and orientation. Because the tool uses a heuristic to decide how to display omnidirectional components, it will not always make the same decision a human user would make. Therefore, the user can override the tool's placement and orientation and manually specify the location and orientation of an omnidirectional component from among the aforementioned eight available directional options.

Data Types and Type Inference

Variable values in the tool of the present invention can take on a variety of data types. Possible embodiments of the present invention could support data types including, but not limited to, Boolean, integer, floating-point, and user-defined enumeration types.

To identify errors, the tool performs static-type checking and issues error notices if components are connected incorrectly. For example, it is not permitted to feed the output of an AND gate into a multiplication component, because multiplication requires a numeric type and Boolean values are not considered numeric.

Most of the time, it is not necessary for a user to explicitly annotate variables as having particular data types. The tool performs type inference operations that can fill in most types automatically. An example illustrates this process.

Figure 21:
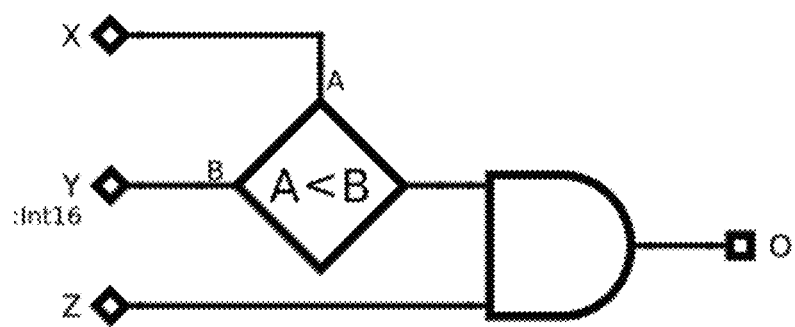
FIG. 21 illustrates an exemplary diagram for use in static analysis and simulation executed by the tool of the present invention.
Figure 22:
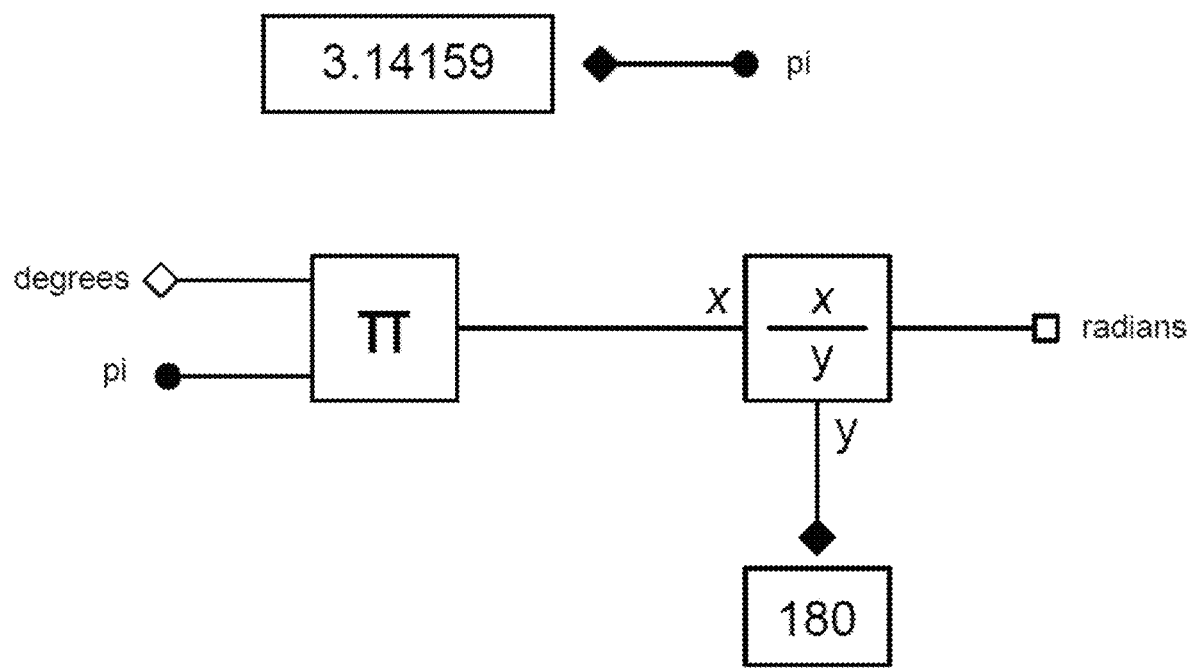
FIG. 22 illustrates a variable named "pi" shared between two wire networks.

The diagram of FIG. 21 has only one type annotation: the input Y has been constrained to the data type "Int16" (i.e., a 16-bit signed two's-complement integer). Yet, the software tool can infer the types of values carried on all the wires in the diagram.

From the fact that AND gates have Boolean inputs and outputs, the tool deduces that Z, O, and the output of the comparator are all Boolean.

The explicit annotation forces Y to have type Int16.

The type of X is not directly constrained by any component connected to it, since comparators can work on different types of values (i.e., they are considered to be polymorphic).

Using similar reasoning, the tool deduces data types for almost all variables in a composite unit definition with a minimum of explicit annotations.

Type Constraints

The tool of the present invention uses a variant of the Hindley-Milner type system. Hindley, J. Roger, *The Principal Type-Scheme of an Object in Combinatory Logic,* 146, Transactions of the American Mathematical Society, 29, 29-60 (1969). Robin Milner, *A Theory of Type Polymorphism in Programming,* 17, Journal of Computer and System Science, 348, 348-374 (1978). Damas, Luis, and Robin Milner, *Principal type-schemes for functional programs,* 9, ACM Symposium on Principles of Programming Languages, 207, 207-212 (1982).

In this system, the type of a variable in a definition can either be a type variable (represented in the tool as Greek letters $\alpha$, $\beta$, $\gamma$ . . . ) or a type constant (Boolean, 64-bit floating point, an enumerated type, etc.). The set of type constants supported can vary significantly between different embodiments of the present invention, and type constants may be data types that are built in to the tool or user-defined data types.

An example of a list of type constants that might be supported by a particular embodiment of the present invention is given below.

Boolean: An enumerated type of the values False and True.

Int8: A signed twos-complement integer type using 8 bits. Supports values from −128 to 127.

Int16: A signed twos-complement integer type using 16 bits. Supports values from −32,768 to 32,767.

Int32: A signed twos-complement integer type using 32 bits. Supports values from −2,147,483,648 to 2,147,483,647.

Int64: A signed twos-complement integer type using 64 bits. Supports values from −9,223,372,036,854,775,808 to 9,223,372,036,854,775,807.

UInt8: An unsigned integer type using 8 bits. Supports values from 0 to 255.

UInt16: An unsigned integer type using 16 bits. Supports values from 0 to 65,535.

UInt32: An unsigned integer type using 32 bits. Supports values from 0 to 4,294,967,295.

UInt64: An unsigned integer type using 64 bits. Supports values from 0 to 18,446,744,073,709,551,615.

Float32: 32 bit floating point number conforming to the IEEE 754 standard.

Float64: 64 bit floating point number conforming to the IEEE 754 standard.

Type constants from the list above will be used when examples of type constants are needed for illustration purposes below.

It should be noted that the standard Hindley-Milner type inference method supports a more general concept of type constructors, which extend type constants to include parameterized types that accept other types as arguments. Moreover, there are a great variety of extensions to the Hindley-Milner type system that have been proposed in the literature. The present invention does not exclude the possibility of embodiments that support extensions to the type system described herein, including extensions beyond those mentioned above.

During the type inference process, all of the types in a composite unit type definition start out as unconstrained type variables. The tool then uses the information in the composite unit type definition to progressively restrict the possible types that each variable can carry. If two constraints conflict, the tool generates an error message.

The simplest constraint, called a type equality constraint, occurs when a variable is directly connected to a child unit input or output that is required to be of a specific data type. This is the case with the wires connected to the AND gate in the example described above. The adjacent networks must all have the type Boolean because that is the only type allowed for those AND gate input pins.

Type equality constraints can also be introduced by the user through explicit annotations within the definition of a composite unit. Such annotations may be placed, for example, on variables, wires, inputs, or outputs, to force the element in question to have the data type specified by the user.

When using polymorphic components, different pins of a component that share the same type variable must be instantiated (substituted) with the same type. This is demonstrated by the comparator in the example above, where the two inputs must have the same type.

Another variety of constraint is called a type class. Wadler, Philip, and Stephen Blott, class, *How to Make Ad-Hoc Polymorphism Less As Hoc,* 16, ACM Symposium on Principles of Programming Languages, 60, 60-76 (1989) (Wadler and Blott 1989). A type class constraint restricts a type variable to be instantiated only with data types that support certain operations. Suppose one tried to change the type annotation on Y in the example above to be Boolean instead of Int16. The tool will generate an error message saying that "The type 'Boolean' does not provide an instance for the type class 'Ordered'." Here, "Ordered" is the name of a type class consisting of types that support "less than"/"greater than" comparisons. The Boolean data type does not support these operations in the tool so an error message is produced.

When the type inference process is completed, the inferred data types are used to construct a type signature for the entire composite unit type, such that the type signature determines how the composite unit type interacts with other diagrams and stitches in which it is embedded. Any remaining type variables and type classes are generalized to become part of the type signature. See the polymorphism discussion below for more details.

Note that the concept of applying Damas-Hindley-Milner type inference with type classes to dataflow modeling languages is not original to the present tool. For example, Tripakis applied such a type inference system to MathWorks's Simulink language. Tripakis, Stavros, Christos Sofronis, Paul Caspi, and Adrian Curic, *Translating Discrete-Time Simulink to Lustre,* 4, ACM Transactions on Embedded Computing Systems (TECS), 779, 779-818 (2005). However, the tool of the present invention includes several innovations beyond this basic type system, as described elsewhere herein.

Unit Polymorphism

A unit is polymorphic if it can be used with different data types for one or more of its I/O pins. For example, consider a switch primitive that selects its output value from one of two input variables based upon a Boolean input. This switch primitive can be polymorphic, because the type of data being switched upon can be different for different switch units. A polymorphic unit includes type variables in its type signature.

Figure 23:
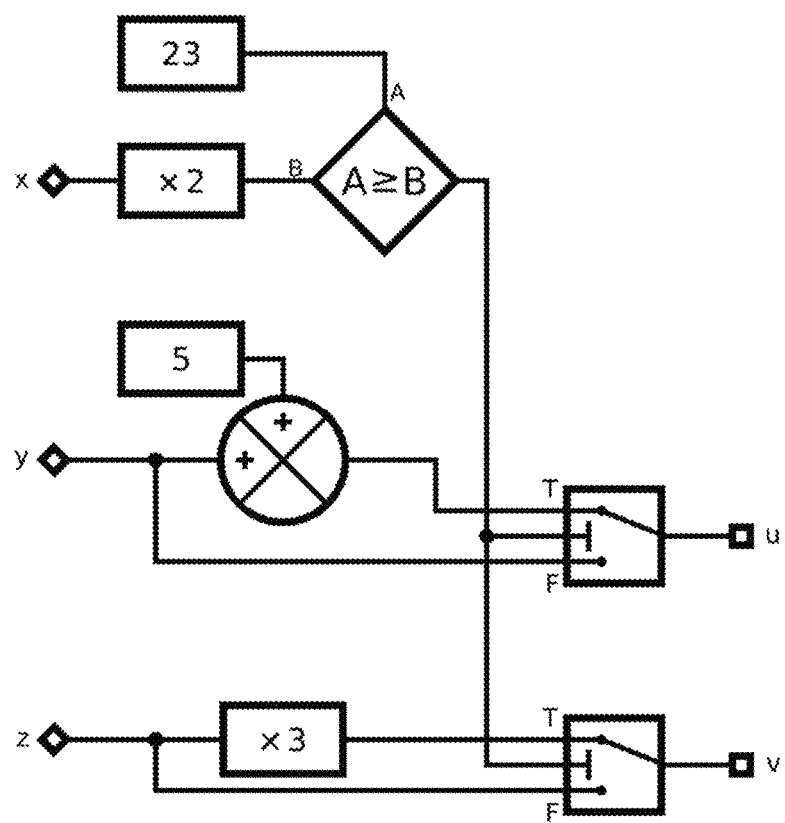
FIGS. 23 and 24 illustrate exemplary diagrams for use in static analysis and simulation executed by the tool of the present invention.

Assume a model using the tool of the present invention comprises two diagrams. The first diagram, named "My Component", performs simple conditional arithmetic depending upon its inputs, such as shown in FIG. 23.

Because "My Component" does not explicitly specify any of its numeric data types, the tool will infer it to be polymorphic in these types. This means that different instances of the component can have different data types for their inputs and outputs, subject to automatically-inferred constraints.

Figures 24, 25:
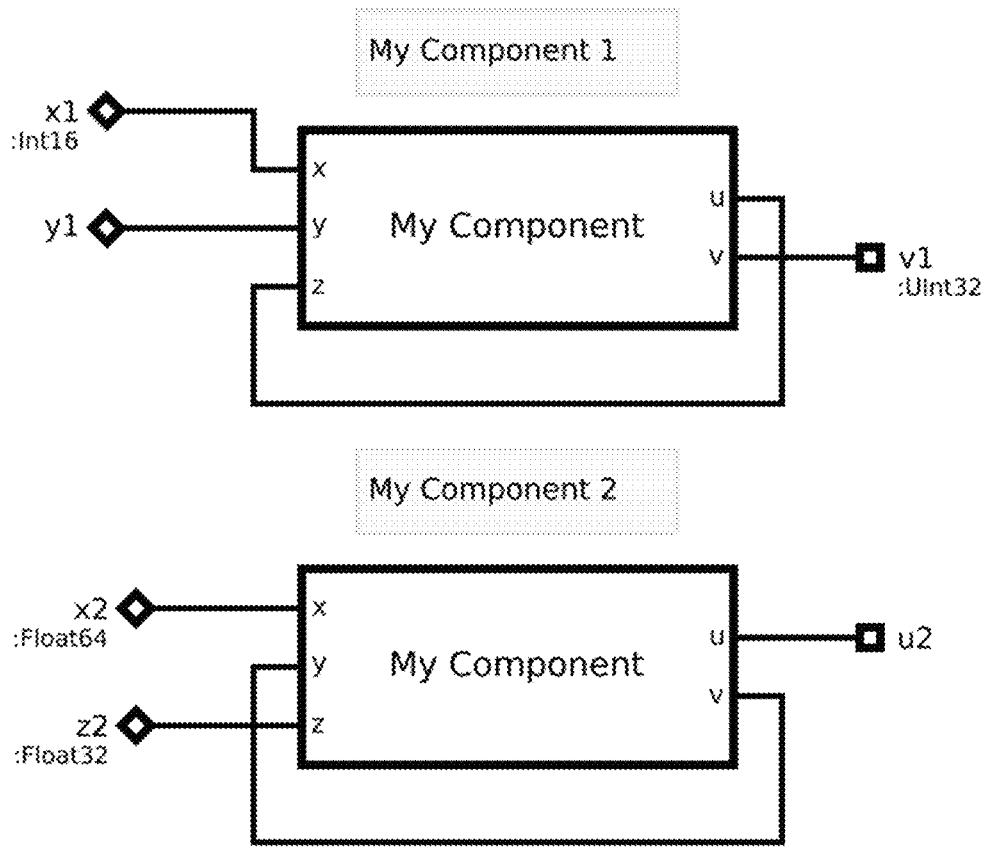
FIG. 25 illustrates information a user can obtain from the tool about a component.

The second diagram, "Component User", is illustrated in FIG. 24 and contains two instances of the "My Component" diagram as custom components. These are referred to in FIG. 24 as "My Component 1" and "My Component 2."

The tool is capable of displaying a description of the unit's inputs, outputs, and associated data types and type variables.

In the case of My Component 1, the tool can display a description of the component's type signature, as depicted in FIG. 25.

FIG. 25 displays a type signature of the component, and is read as follows:

The first line says the unit is named "My Component 1" and is of type "My Component." The "Type variables" line says that there are three type variables that must be substituted with type constants to simulate a unit of type "My Component." The tool has arbitrarily named these type variables with the Greek letters $\alpha$, $\beta$, and $\gamma$. It also says that the types $\alpha$, $\beta$, and $\gamma$ are each constrained to be numeric data types (since My Component performs arithmetic operations on values of those types), and $\gamma$ is also constrained to be an ordered data type (since an ordering comparison is being performed on a value of that type).

The table in the middle of FIG. 25 lists the data types of each input and output. From the table, the user can determine that input $\gamma$ and output u must have the same data type $\alpha$. Input z and output v must have the same data type $\beta$. (The reference to "pure" in FIG. 25 relates to the constness inference, as described elsewhere herein). The "With substitutions" line at the bottom explains that, in the My Component 1 instance, $\alpha$ and $\beta$ are instantiated to the type UInt32, and $\gamma$ to the type Int16. These are the actual types that are used to calculate values for this instance during simulation.

As can be seen from FIG. 24, in the "My Component 2" instance, on the other hand, the data types are Float32 for $\alpha$ and $\beta$ and Float64 for $\gamma$. This means that integer-valued constants, arithmetic, and comparisons are used in My Component 1, while floating-point constants, arithmetic, and comparisons are used in My Component 2. This information is inferred by the tool from the structure of the two diagrams.

Type Constraints for Literals Values

Embodiments of the present invention may support components that can contain literal values, i.e., data values written directly into the component by the user. Examples of possible such components include:

Literal component: Outputs a specified constant value.

Inline Adder component: Accepts a numeric input value and outputs the sum of that input value with a specified constant value.

Inline Comparator component: Accepts an input value and outputs the Boolean result of performing a relational comparison test (e.g. "not equal to", "less than", or "greater than or equal to") between the input and a specified constant value.

Numeric literal values in the tool are polymorphic, so that, e.g., an Inline Comparator component checking the condition "less than 2" can be used with any integer or floating-point data type.

However, not all numeric literals can be used with all numeric data types. For example, the literal "−1000" (negative one thousand) can be used with the signed integer data types Int16, Int32, and Int64, as well as the floating-point data types Float32 and Float64. However, it cannot be used with the unsigned integer data types UInt8, UInt16, UInt32, and UInt64, because these data types do not support negative values. It also cannot be used with the data type Int8, because this data type's range of −128 to +127 does not include the value −1000.

To implement these rules, when a numeric literal value is written into a component by a user, the tool generates a special type constraint that enforces that the literal value in question is a valid value for its data type. This type constraint is propagated in the same fashion as an ordinary type class constraint. When a type constant is unified with the type variable in this constraint, the tool checks that the value in the constraint is a valid value for that type constant, and generates an error message if it is not.

For example, for a constant literal component with a value "−1000" and with the data type of the output pin being the type variable α, the tool generates a type constraint "'−1000' is a valid α value". If, during the standard process of Hindley-Milner type inference, the tool unifies the type variable α with the type constant Int8, then the tool will generate an error message because −1000 is out of the range of the Int8 data type and therefore the constraint "'−1000' is a valid Int8 value" is false.

Constness Inference

It is common in software to have constants, i.e., values that, by design, never change at runtime. The present tool includes features that work with statically constant variables whose values are known to never change during a simulation. Statically constant values are indicated as gray wires in the diagram editor. I/O names connected to statically constant variables are drawn with a gray font.

Figure 26:
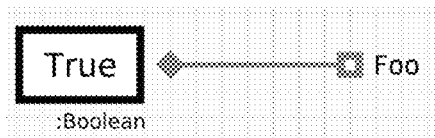

For example, in FIG. 26 a value of a single output named "Foo" is always TRUE. The tool includes two inference methods for identifying variables that are statically constant, called forward constness inference and backward constness inference. These two inference methods interact with each other to identify static constants more effectively.

Forward Constness Inference

Non-stateful components (i.e., components which require no memory to store the state from the previous frame), such as literals and arithmetic operations, are called pure. The tool of the present invention can recognize calculations performed using only constant values and pure operations and can perform constant propagation to conclude that the results of such calculations must also be constant. The general concept is essentially the same as the well-known constant propagation technique used in compilers. Wegman, Mark N. and F. Kenneth Zadeck, *Constant Propagation with Conditional Branches*, 13, ACM Transactions on Programming Languages and Systems, 181, 181-210 (1991).

Figure 27:
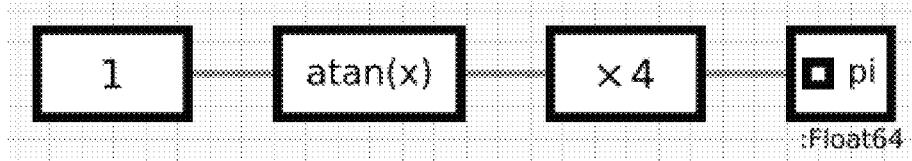

For example, the tool deduces that all of the values in FIG. 27 are statically constant because only pure operations are involved.

The tool of the present invention extends the constant propagation concept to work automatically with child units of composite units as well. Consider a custom component called "My Component" as defined in FIG. 28. The "a" symbol indicates a single frame (time interval) delay.

None of the values in "My Component" are necessarily constant in all instances, but some of them will be constant if the input "A" is given a constant value. If we include "My Component" in a diagram (see FIG. 29) that gives a constant value to "A," the tool deduces that the output "B" must also be constant, while C is still non-constant due to the one-frame delay.

The tool deduces this based on information in the type signature inferred for "My Component." An illustration of the type signature for My Component as shown by the tool is given in FIG. 30.

Notice that the output "B" is inferred to be pure, while "C" is not. The tool marks a value as being constant if it is produced by a pure output of a component and all of the inputs of that component on which the output is dependent have been given constant values. Similarly, the tool marks a value as pure if it is produced by a pure output of a component and all of the inputs of that component on which the output is dependent are pure.

This information is computed by the tool once for each unit type definition, using the previously-computed constness signatures of child units to compute the constness signature of any definition referencing those units.

Figure 28:
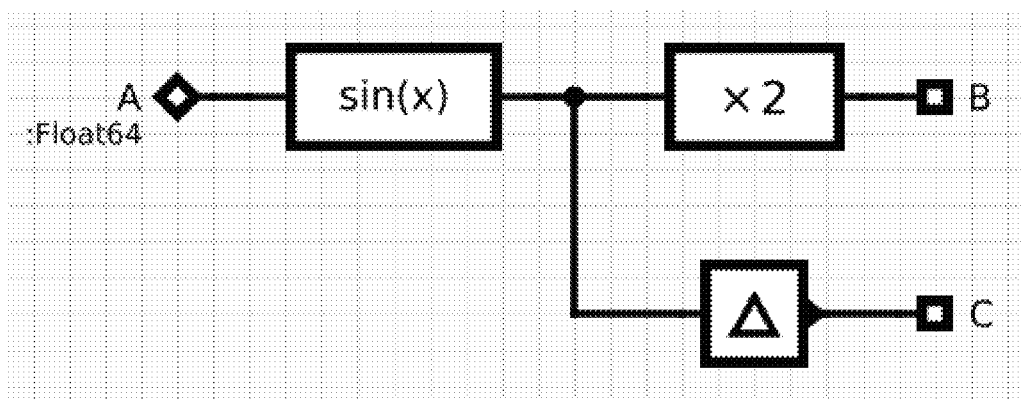

The tool also propagates constness information into instances when the user is viewing a diagram in instance mode. In the case of FIGS. 28 and 29, the instance of My Component is shown as in FIG. 31, illustrating how the tool propagated the constness to determine that "A" and "B" are statically constant.

Backward Constness Inference

In all of the examples described to this point, the tool automatically deduces that values are constant by propagating constness from producers to consumers. However, the tool also allows the user to work in the other direction, by specifying that certain values must be constants and allowing the software to infer which inputs must be constant to make that possible. The user can mark an I/O of a diagram as requiring a constant value by setting the Constness annotation property of the I/O component. This feature is useful for making components that insist on constant values for certain inputs.

Assume in the definition of My Component in the diagram of FIG. 31, that the "B" output had its constness annotation set to "must be constant." The tool works backward and automatically determines that the input "A" must be a constant value.

If the user then tries to use My Component with a non-constant value for "A", the tool generates an error, stating that the referred-to component requires a constant value but the supplied value is not a constant. The same error occurs if the user tries to set "C" to "must be constant" in the definition of My Component, since the output of the one-frame delay cannot be statically constant.

Non-Atomic Execution and Instantaneous Dependencies

A well-known problem in dataflow models is the concept of atomicity, meaning whether it is permissible to loop around the output of a component to feed into its input (possibly through intervening logic), as long as there is no possibility of an actual data dependency cycle. An example of a dataflow language that permits such looping-around is Lustre, whose compiler flattens the input model before compilation to ensure that all definitions can be treated non-atomically. Halbwachs, Nicholas, Paul Caspi, Pascal Raymond, and Daniel Pilaud, *The Synchronous Data Flow Programming Language LUSTRE*, 79, Proceedings of the IEEE, 9 (1991). Other dataflow languages, such as the industrial Lustre derivative SCADE, treat all user-defined units atomically and do not permit this type of loopback. Halbwachs, Nicolas, *A Synchronous Language at Work: the Story of Lustre*, MEMOCODE (2005).

In the present tool, every unit is non-atomic, even the reusable components. Thus, it is acceptable to write a model where the inputs of a component are dependent on the outputs of the same component, as long as there is no actual data dependency cycle. This feature is useful for modeling communicating redundant subsystems and in other situations.

For example, assume a project defined by two diagrams. The first diagram, named "My Component", performs some simple conditional arithmetic operations as set forth in FIG. 32.

Figure 33:
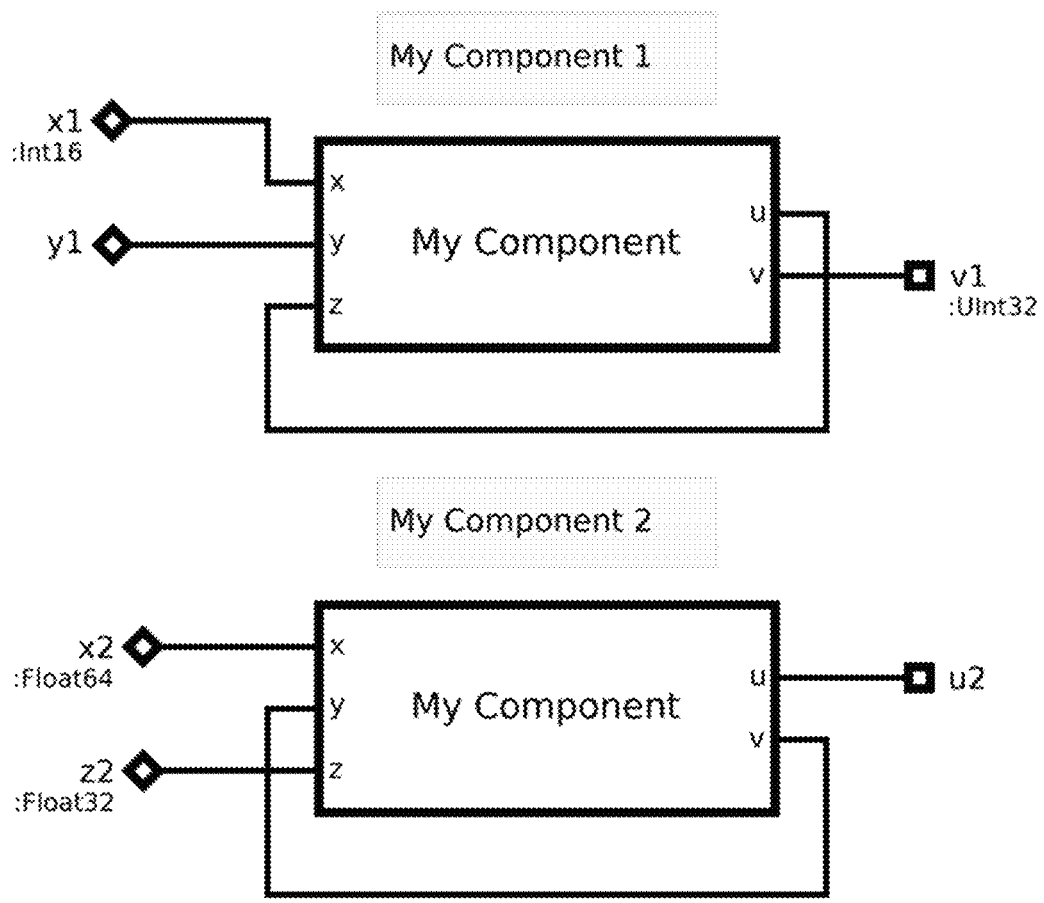

The second diagram, FIG. 33, named "Component User", contains two instances of the "My Component" diagram as custom components, named "My Component 1" and "My Component 2":

Note that both instances of My Component (as set forth in FIG. 32) in the Component User diagram of FIG. 33, are used non-atomically, i.e., it is permissible to loop the output of both My Component instances back to feed into an input of My Component, as there is no possibility of a data dependency cycle.

To ensure correct evaluation of the computations in My Component 1, the logic for computing output u (see FIG. 32) must be executed before the logic to compute output v can begin, because the output from u is wrapped around to input z, where z is used to calculate v, the output of My Component 1.

Conversely, in My Component 2, the input values x and z are both required to calculate the output v, which is then wrapped around to input y to compute the output value u. For My Component 2, the value of the output v must computed before the value of output u to ensure that there is no data dependency cycle, rather than computing u before v as in My Component 1.

The system "Component User" is acceptable and error-free in the tool of the present invention because there is no actual data dependency cycle in either instance of My Component.

Figure 32:
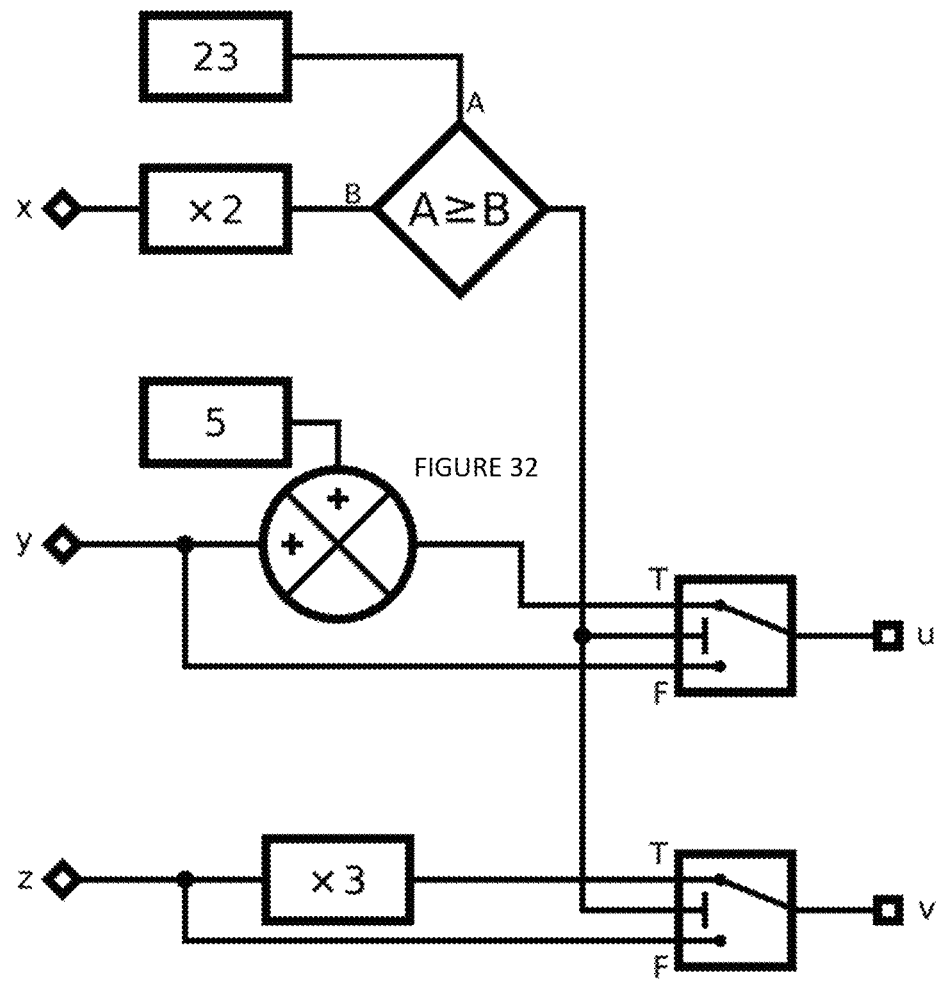

Note also from FIG. 32 that calculations performed using input x are independent of the calculations to determine u and v, but x is required to compute both u and v. Suppose the user creates a variant of FIG. 33 where u or v is wrapped around to input x without an intervening one-frame delay. Upon doing this, the tool generates an error in the definition of this variant diagram, because this dependency is cyclic and therefore illegal.

The method used by the aforementioned Lustre compiler for handling non-atomic definitions, i.e. flattening the entire model from the root of the instance hierarchy down to non-composite units, is extremely inefficient. In fact, the method can take time and memory that is exponential in the size of the input definitions. It also impedes separate compilation of unit definitions.

The present tool avoids these issues by instead computing an instantaneous dependency relation, which is a relation (in the mathematical sense) between the inputs and the outputs of a unit in which an input is related to an output if the output's value at a particular instant in time could potentially be affected by the input value at the same point in time.

In the case of composite units, this can be computed by saying that an input is related to an output in the instantaneous dependency relation if there is a data dependency path from that input to that output that passes only through instantaneous dependencies of child units of the composite unit, with the input model being in error if any such instantaneous dependency path contains a cycle.

Most non-composite units in a typical embodiment of the present invention will have complete instantaneous dependency relations. (A unit has a complete instantaneous dependency relation if every output of the unit is instantaneously dependent upon every input of the unit.) The most notable exception is the One Frame Delay component (sometimes referred to in other tools as a Unit Delay, and represented in the figures of this invention by a "a" symbol enclosed in a box). A One Frame Delay component can be inserted into a diagram to break a dependency cycle, by replacing the instantaneous dependency cycle with a non-instantaneous (delayed) dependency.

The tool computes the instantaneous dependency relation for a composite unit type definition and checks for cyclic dependency errors using a graph search. The tool computes the instantaneous dependency relation once for each unit type definition, recursively using instantaneous dependency relations previously computed for other units to compute the instantaneous dependency relations of definitions that reference those units. This technique avoids, during model static analysis, the exponential time and space blowup experienced in Lustre.

Since it may not be easy to determine when it is permitted to loop a data dependency back around to an input, the tool provides a feature to help the user visualize these rules.

To determine the existence of instantaneous data dependencies, the user can request that the tool display the data dependencies of a particular input or output pin of a component in a diagram. In one possible embodiment, the tool displays the dependencies for a pin when the user hovers over that pin with the mouse cursor.

Figure 34:
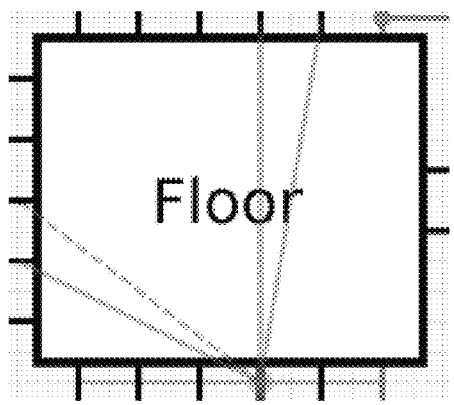
FIG. 34 illustrates a method of displaying data dependencies between input and output pins of a component in a diagram.

When the user requests to view the data dependencies of a certain output pin, for each input pin of the component the tool displays whether the output pin has an instantaneous dependency upon the input pin, a non-instantaneous dependency upon the input pin, or no dependency upon the input pin. FIG. 34 illustrates one possible embodiment in which the type of dependency between a pair of pins is indicated in the tool by displaying one of a blue translucent line, a gray dashed line, or no line, as described below.

- A blue translucent line indicates an instantaneous dependency on an input of that component. This means that the value of that input is used to compute the value of that output within a single frame of execution. The user cannot use the value of an output to compute the value for an input on which it instantaneously depends without inserting a One Frame Delay component to break the logical cycle and ensure a well-defined behavior during the simulation.
- A gray dashed line from an output to an input is similar to a blue line, but indicates only a dependency, but not an instantaneous dependency. This most commonly occurs when a component contains a one-frame delay for execution.
- The complete absence of a line means that the value of the output is not in any way dependent on the input value in question.
- When either a gray dashed line or no line is present between an output and an input, it is permissible to wrap that output around to compute the value for that input, because there is no instantaneous dependency cycle.

The user can also request that the tool display the dependencies for an input pin. In this case, the tool applies the same rules, but in reverse, displaying for each output pin whether the output pin has an instantaneous dependency upon the input pin, a non-instantaneous dependency upon the input pin, or no dependency upon the input pin.

Simulations and Timelines

The tool provides powerful simulation features that can be used for anything from quick experimentation during development to formal expected results generation for verification and validation of safety-critical systems. This flexibility is provided by the tool's high-speed simulation and the ability to simulate any part of a project at any time. The user can edit a diagram while a simulation is open, and the results will automatically update when the user's diagram changes have been saved.

A simulation is based on a discrete-time design. Time is broken into frames, which occur at regularly-spaced instantaneous points in time. The "wall clock" time between frames is controlled by the project frame rate, which is a global variable edited in the project options menu. This variable only has a meaningful effect on models that query it using the project frames per second primitive or a component embedding that primitive; otherwise, it is purely for display purposes in the graphical user interface.

For each frame, all of the units in the instance hierarchy under simulation are executed exactly once. The results produced by the tool are always the simulated values at the end of the executed frame. The order that the tool chooses to execute the units is irrelevant, except that a value will always be produced before it is consumed within a frame. This makes the simulation very predictable and easy-to-understand.

The primary unit of simulation in the tool is simply called a simulation. A simulation represents a single execution of a model over a period of time. New (i.e., not previously saved) simulations can be easily created in the tool.

Every simulation has a reference to a simulation root, which is a unit type definition representing the subsystem to be simulated. The reference to the simulation root is saved as part of the simulation file. In one possible embodiment, the simulation root is restricted to be a composite unit, e.g. a diagram or a stitch; however, this restriction is not an inherent limitation of the present invention. When the user creates a new simulation in the tool, its simulation root is set to the current GUI root. The user can also change the root of a simulation after creating it. In one embodiment, this can be accomplished by dragging-and-dropping a unit type definition into the simulation editor from a source such as a list of unit type definitions in a model.

Figure 35:
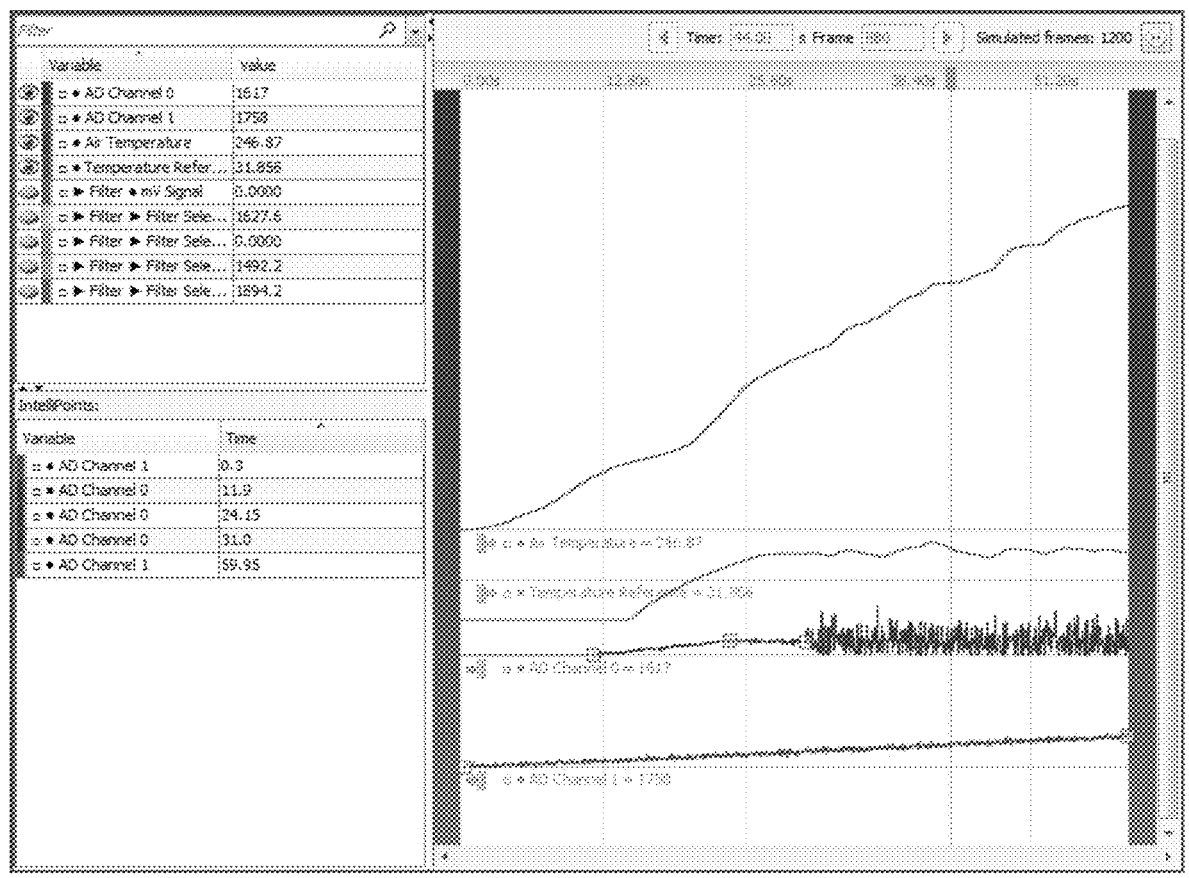
FIG. 35 illustrates a timeline display.

With reference to FIG. 35, the tool's editor for a simulation is called a timeline since the main content of the editor is the large area where waveforms—Cartesian plots of the simulated values of variables—are displayed. Each waveform corresponds to a specific variable within the instance hierarchy of the simulation root.

The user can add waveforms to the timeline, so that values of selected variables are visible. In one embodiment, waveforms can be added by dragging one or more instance variables or unit instances into the timeline from the Instance tree view. When adding a unit instance rather than an individual variable, all of that instance's input and output variables (but not its local variables) are added to the simulation.

In the timeline, the x-axis represents time and the y-axis represents the values of variables. It is not necessary to display all variables using the same scale. Each waveform has a baseline that shows the zero point for that variable's plot, and a scale that specifies the size ratio between the value of the variable and pixels on the screen.

In one embodiment, the user can edit the baseline offset and scale of a waveform by selecting the waveform and editing the corresponding properties in the Properties view of the tool. The user can also drag waveforms vertically to move their baseline and drag (while holding the "Alt" key in one embodiment) to change their scale. The icon in the baseline serves as a "handle" that can also be used to grab and drag the variable. Variables for display can also be selected in the test from a list on the left side of the timeline. This list also includes an eye icon for each variable that the user can click to toggle whether the variable is shown or hidden.

The tool includes a time cursor, which is a display element indicating a focused position in time that has been selected by the user within the simulation. One possible embodiment of the time cursor is as follows: when the user moves the mouse pointer over a timeline, the tool shows a thin blue line representing the point in time where the mouse is pointed. When the time cursor is placed at a frame, it displays the value each variable attained after execution of the focused frame. In one embodiment, these values are displayed in the table on the left side of the timeline and in the baseline for each waveform.

The time cursor allows the user to see the values stored by the tool at any point in time during the simulation. See the commonly-owned U.S. patent application Ser. No. 13/302, 546, filed on Nov. 22, 2011, entitled Model Based Verification Using Forward and Reverse Traversal of Variable Time Line (inventors Amalfitano, Stockton, and Marot), which is hereby incorporated by reference in its entirety.

In one embodiment double-clicking on an empty region of the timeline locks the time cursor. The user can then move the mouse around freely without the time cursor following with it. When the time cursor is locked, it is displayed in a gray color instead of the blue color, and the x- and y-axis rulers at the edges of the timeline area also switch from blue to yellow. The time cursor can be unlocked by right-clicking it.

Controlled Variables and Intellipoints

When creating a simulation, the user selects some subset of the variables in the instance hierarchy to be simulated as the variables the user wants to view in the timeline. These variables are said to be added to the simulation. If the user simply adds variables to a simulation without doing anything else, all of the inputs of the simulation root will be given constant default values. In order to make the input interesting, the user must control some variables. A controlled variable's ordinary simulation behavior is overridden to give it a different set of values for the entire length of a simulation. Most of the time, the user will want to control variables that are inputs to the simulation root; however, the user can also control intermediate variables, which will affect anything downstream of those variables in the instance hierarchy being simulated. This feature is useful for unit testing and robustness testing.

Figure 36:
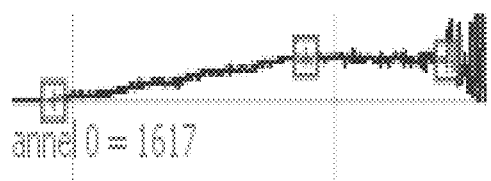
FIG. 36 illustrates the values of a variable over time displayed as a waveform and defined by IntelliPoints.

A variable becomes a controlled variable, and is therefore overridden in the manner described herein, when the user sets one or more IntelliPoints on it. An IntelliPoint (short for Intelligent Point) is a control point (key-frame) that lets the user specify the value(s) for a variable during a period of time. See the commonly-owned U.S. patent application Ser. No. 13/302,537, filed on Nov. 22, 2011, entitled Verification of Signal Processing Using Intelligent Points (inventors Amalfitano, Stockton, and Marot), which is hereby incorporated by reference in its entirety. See FIG. 36.

The user can create an IntelliPoint on a variable by double-clicking the variable's waveform at the desired time, and delete an IntelliPoint by right-clicking it, similar to the time cursor lock/unlock function.

By default, an IntelliPoint sets a variable to a constant value for the span of time starting at the IntelliPoint and ending at the next IntelliPoint. But the user can change the time and value of the IntelliPoint by dragging it around in the timeline. However, to achieve more advanced behavior for the IntelliPoint, the user must edit its properties in the Properties view. The most common case is to linearly interpolate between the current IntelliPoint and the next one, which is done by changing the first IntelliPoint's "Interpolation base" property from "constant" to "linear". The user can also use IntelliPoints to generate sine waves, Gaussian noise, and more.

Figure 37:
FIG. 37 illustrates a variable having a constant value over time, defined by a constant IntelliPoint.

Variables that are inferred through forward or backward constness inference to be statically constant cannot be controlled with the conventional IntelliPoint. Instead, the tool generates a special "constant value" control point that is displayed at frame 0 in the timeline, as illustrated in FIG. 37. This ensures that constant values are still constant even if the user is controlling them.

Stitches

Figure 38:
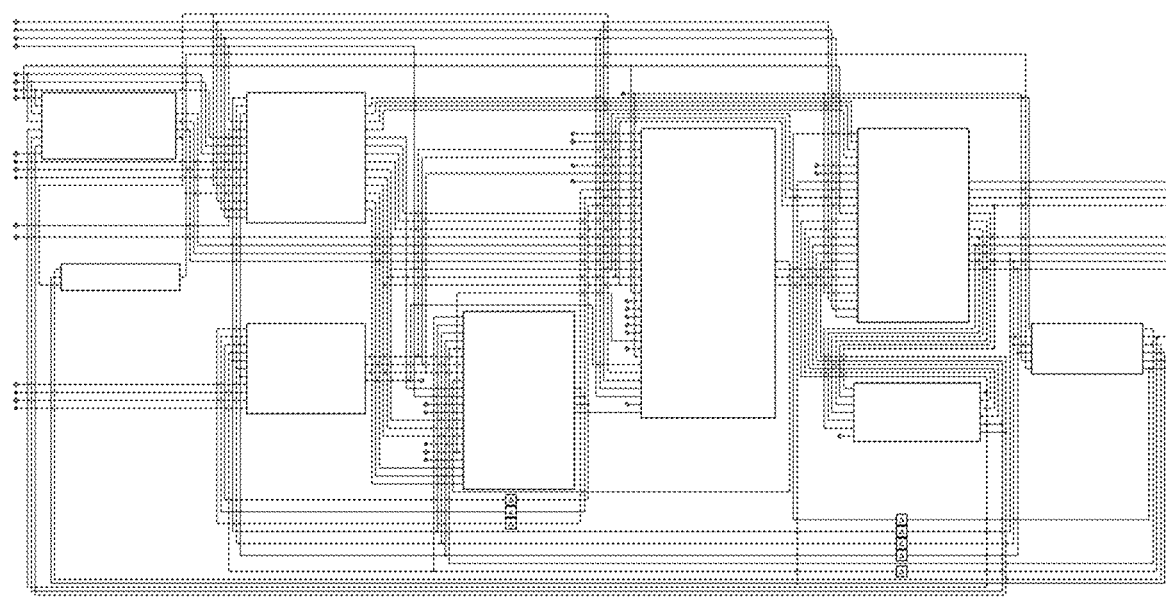
FIG. 38 illustrates a portion of an anonymized model of a safety-critical embedded system.

It is a common situation when using dataflow languages to have a large number of diagrams which the user wants to connect together. This often arises when each diagram performs a specific operation on some group of input variables to produce some group of output variables, and the diagrams share variable names and simply need to be connected to form a larger subsystem. One option for the user is to create a large diagram that has all of the other diagrams as custom components, but this tends to result in a spaghetti-like mess of wires, as seen in FIG. 38, which is anonymized from a model of a real-world safety-critical embedded system.

The tool provides a feature called "stitches" to resolve this issue. Stitches formalize a number of design patterns that commonly occur when describing embedded software.

A stitch is a composite unit type definition consisting of a pair of tables, with one table describing the list of all child units of the definition, and the other table listing all variables in the definition, and the child unit I/Os that produce and consume them.

The tables in a stitch need not be literal tabular two-dimensional data. Possible embodiments include relational database tables, lists or other data structures, and various linear or grouped user interface elements.

A stitch cannot contain non-composite units, only composite units such as diagrams and other stitches. The restriction that stitches can only contain other composite units forces modelers to place the actual logic of a system in diagrams where it is easily visible, ensuring that there cannot be "magic tables" that change the functionality of the system beyond connecting different pieces to each other.

Figure 39:
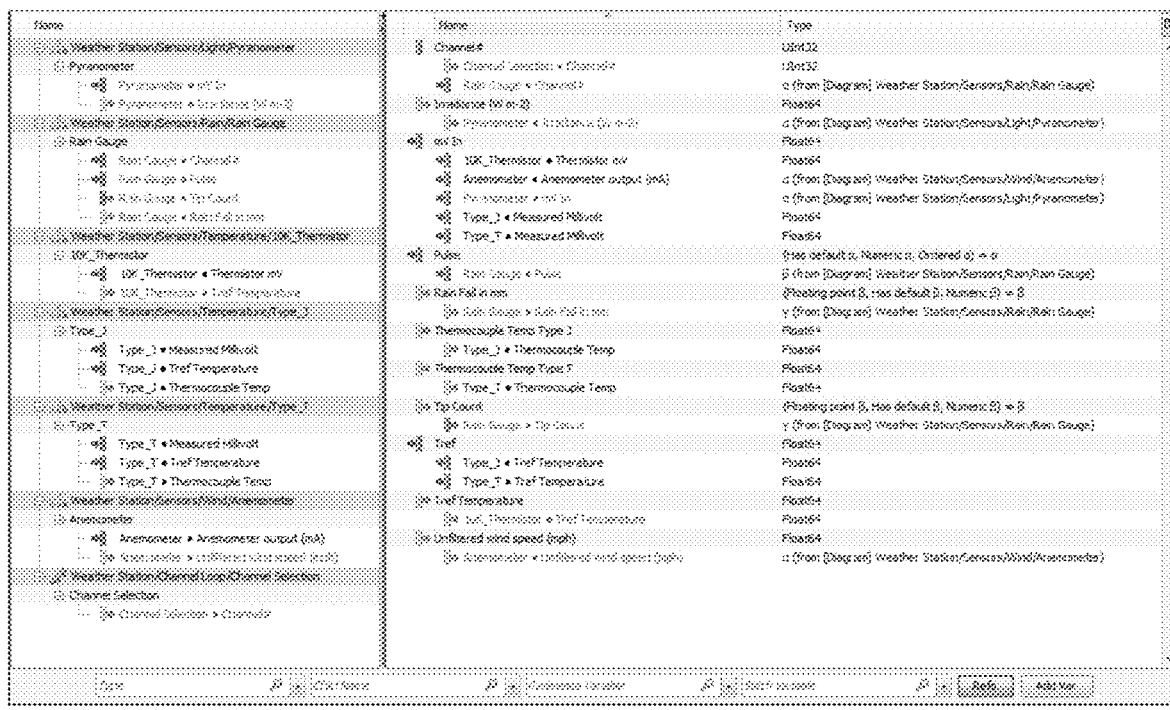
FIG. 39 illustrates a stitch editor of the present invention.

In one embodiment of the tool, the stitch editor appears as in FIG. 39.

In the embodiment depicted in FIG. 39, the left-hand table is the list of child units of the stitch, grouped by unit type. The user can add more child units by dragging a composite unit definition from the Projects view into the table in the stitch editor. The user can rename a child unit by editing the name inline in the table.

In the embodiment depicted in FIG. 39, the right-hand table is the list of variables in the stitch. Each variable shows below it the list of all of the child unit inputs and outputs that are connected to it.

By default, when the user adds a child unit to a stitch, all of the child unit's I/Os are automatically mapped to variables of the same name. The effect of this is that any child unit I/Os with the same variable name are automatically connected together in the stitch by default. This is convenient for the common case when the I/O names of subsystems line up with each other and just need to be connected together. In one embodiment, the user can simply drag all of the subsystems into a new stitch, and the matching names will be connected automatically.

In the less common case where the user wants to assign different names to a child unit's I/Os, they can override the default mapping. For any individual child unit I/O, the user may assign that child unit I/O to a stitch variable with a name other than the name matching that child unit I/O. Since this operation changes the name to which a child I/O is mapped, the operation is called "custom name mapping". In one possible embodiment, the user can perform custom name mapping by dragging the names of the child I/Os up and down between stitch variables in the right-hand table.

Dynamic Resimulation and In-Memory Compression

When displaying a simulation, the tool provides the user with the illusion that it has instant access to every value in a model at every time during a simulation. See the commonly-owned U.S. patent application Ser. No. 13/302,546, filed on Nov. 22, 2011, entitled Model Based Verification Using Forward and Reverse Traversal of Variable Time Line (inventors Amalfitano, Stockton, and Marot), which is hereby incorporated by reference in its entirety.

If the tool actually stored every computed value in memory without any form of data compression, simulations on large models or over a large number of frames would use unacceptable amounts of memory. Instead, the tool uses several techniques to reduce memory usage while maintaining fast access to simulated data at all parts of the system over the entire length of a simulation.

One technique used by the tool is referred to as dynamic resimulation. This consists of storing only some of the simulated data for the variables in the model, then recomputing the missing data on demand using the data that is stored. This generates identical results to the original simulation, but without having to hold all of the simulated data in memory at once.

Another technique used by the tool of the present invention is in-memory compression. This consists of applying a compression algorithm to the simulated variable data from the model while it is stored in memory. The simulated data is decompressed on the fly when it is needed in the user interface. While any form of data compression could be applied to the simulated data in memory, it is important for user interface responsiveness that the software maintain efficient access to every stored variable value at every point in time in the simulation. Thus, a compression algorithm is used that permits efficient random access into the simulated variable data.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention.

It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise.

Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims to particular combinations of features will be developed, it should be understood that the scope of the disclosure of the present invention also includes any novel feature or any novel combination of features disclosed herein either explicitly or implicitly or any generalization thereof, and whether or not it mitigates any or all of the same technical problems as does the present invention.

Features, that are described in the context of separate embodiments, may also be provided in combination in a single embodiment. Conversely, various features, which are for brevity, described in the context of a single embodiment, may also be provided separately or in any suitable sub-combination. The Applicants hereby give notice that new claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, however, in some instances they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include non-limiting examples such as: a computer; a stationary and/or portable computer; a mobile device; a wearable device; an IoT (Internet of Things) device; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to but is not limited to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to but is not limited to any storage device used for storing data accessible by a computer. Non-limiting examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to, but is not limited to, a system having one or more computers, where each computer may include a computer-readable medium embodying software to operate the computer or one or more of its components. Non-limiting examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); private area networks (PAN); peer2peer network; point2point communications; and a combination of networks, such as an internet and an intranet.

Exemplary networks may operate with any of a number of protocols, such as Internet protocol (IP), transmission control protocol (TCP), asynchronous transfer mode (ATM), and/or synchronous optical network (SONET), user datagram protocol (UDP), IEEE 802.x, near field communication (NFC), Bluetooth™, Wi-Fi™, LoRa™, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, or the like. These computer program products may provide software to a computer system. Embodiments of the invention may be directed to such computer program products.

An algorithm as referred to herein is generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

What is claimed is:

1. A method comprising:
   accessing a dataflow model of a system, the dataflow model comprising a plurality of unit types;
   enabling user designation of one of the plurality of unit types as an instance root, at least two of the plurality of unit types being valid options for user designation as the instance root; and
   responsive to a user designating the instance root, simulating an instance hierarchy induced by the instance root, wherein the instance hierarchy is dependent on which of the plurality of unit types is designated as the instance root.

2. The method of claim 1 wherein the plurality of unit types comprises one or more composite unit types, the one or more composite unit types comprising one or more diagrams and stitches.

3. The method of claim 2 wherein each stitch comprises a stitch definition, the stitch definition comprising a first table showing child units of the stitch definition and a second table showing variables of the stitch definition and the child units that produce or consume each of the variables of the stitch.

4. The method of claim 1 wherein the plurality of unit types comprises one or more non-composite unit types, the one or more non-composite unit types comprising primitive unit types and table unit types.

5. The method of claim 1 further comprising displaying in a graphical user interface a representation of part or all of the instance hierarchy induced by the instance root.

6. The method of claim 5 wherein the representation comprises a navigable tree view of the instance hierarchy induced by the instance root.

7. The method of claim 5 wherein the representation comprises a navigable breadcrumbs view of the instance hierarchy induced by the instance root.

8. The method of claim 1 further comprising, responsive to the user designating the instance root, displaying the instance hierarchy as a list of instances of the plurality of unit types of the dataflow model extending from the instance root.

9. The method of claim 1 further comprising, responsive to a user designating a unit instance from among the list of instances in the instance hierarchy, displaying a unit type definition of the designated unit instance, and modifying the display of the unit type definition to include information specific to the designated unit instance.

10. The method of claim 9 wherein the information specific to the designated unit instance comprises instance paths to one or more variable names or child units in the instance hierarchy.

11. The method of claim 9 wherein the information specific to the designated unit instance comprises values of one or more variables within the designated unit instance.

12. The method of claim 11 wherein the values of the one or more variables are simulated values from a simulation.

13. The method of claim 11 wherein the values of the one or more variables are obtained from an implementation of the system represented by the dataflow model.

14. The method of claim 1 wherein the data flow model comprises definitions characterizing behavior of each one of the plurality of unit types in the data flow model.

* * * * *